United States Patent
Shaw

(10) Patent No.: US 7,346,492 B2
(45) Date of Patent: *Mar. 18, 2008

(54) SYSTEM AND METHOD FOR COMPUTERIZED PSYCHOLOGICAL CONTENT ANALYSIS OF COMPUTER AND MEDIA GENERATED COMMUNICATIONS TO PRODUCE COMMUNICATIONS MANAGEMENT SUPPORT, INDICATIONS, AND WARNINGS OF DANGEROUS BEHAVIOR, ASSESSMENT OF MEDIA IMAGES, AND PERSONNEL SELECTION SUPPORT

(75) Inventor: Eric D. Shaw, Chevy Chase, MD (US)

(73) Assignee: Shaw Stroz LLC, New York, NY (US)

(*) Notice: Subject to any disclaimer, the term of this patent is extended or adjusted under 35 U.S.C. 154(b) by 994 days.

This patent is subject to a terminal disclaimer.

(21) Appl. No.: 10/393,950

(22) Filed: Mar. 24, 2003

(65) Prior Publication Data
US 2003/0212546 A1 Nov. 13, 2003

Related U.S. Application Data

(63) Continuation-in-part of application No. 09/767,838, filed on Jan. 24, 2001, now Pat. No. 7,058,566.

(60) Provisional application No. 60/426,014, filed on Nov. 14, 2002.

(51) Int. Cl.
G06F 17/27 (2006.01)

(52) U.S. Cl. .................. 704/9; 704/257; 704/255

(58) Field of Classification Search .................. 704/4, 704/6–9, 251, 257, 255; 434/236
See application file for complete search history.

(56) References Cited

U.S. PATENT DOCUMENTS 5,371,673 A 12/1994 Fan (Continued)

OTHER PUBLICATIONS

Carma International website; www.carma.com.

(Continued)

*Primary Examiner*—Huyen X. Vo
(74) *Attorney, Agent, or Firm*—Antonelli, Terry, Stout & Kraus, LLP.

(57) ABSTRACT

At least one computer-mediated communication produced by or received by an author is collected and parsed to identify categories of information within it. The categories of information are processed with at least one analysis to quantify at least one type of information in each category. A first output communication is generated regarding the at least one computer-mediated communication, describing the psychological state, attitudes or characteristics of the author of the communication. A second output communication is generated when a difference between the quantification of at least one type of information for at least one category and a reference for the at least one category is detected involving a psychological state, attitude or characteristic of the author to which a responsive action should be taken. The content of the second output communication and the at least one category are programmable to define a psychological state, attitude or characteristic in response to which an action should be taken and the action that is to be taken in response.

71 Claims, 9 Drawing Sheets

U.S. PATENT DOCUMENTS

| | | |
|---|---|---|
| 5,781,879 A | 7/1998 | Arnold et al. |
| 5,961,332 A * | 10/1999 | Joao .......................... 434/236 |
| 5,996,011 A | 11/1999 | Humes |
| 6,128,646 A | 10/2000 | Miloslavsky |
| 6,332,143 B1 | 12/2001 | Chase |

OTHER PUBLICATIONS

PRTrak website www.prtrak.com.

Pennebaker et al, James; Manual entitled "Linguistic Inquiry and Word Count" LIWC2001, 2003, The University of Texas at Austin and the University of Auckland, New Zealand, Erlbaum Publishers, Mahwah, NJ.

* cited by examiner

FIG. 1
(PRIOR ART)

1. QUANTITY OF SPEECH
2. LONG PAUSES
3. RATE OF SPEECH
4. NONPERSONAL REFERENCES
5. I
6. WE
7. ME
8. NEGATIVES
9. QUALIFIERS
10. RETRACTORS
11. DIRECT REFERENCES
12. EXPLAINERS
13. EXPRESSIONS OF FEELINGS
14. EVALUATORS

OF NEGATIVES ON 4/10 VERSUS MEAN

OF EVALUATORS ON 4/10 VERSUS MEAN

ANGER SCORES ON 4/10 VERSUS MEAN - # OF WORDS/EMAIL

OF ALERT PHRASES ON 4/10 VERSUS MEAN

CONTINUED COVERT HOSTILITY: PSYCHOLOGICAL DISTANCE OVER TIME

PSYCHOLINGUISTIC MEASUREMENT OF DECEPTION: OVERT VS. COVERT DECEPTION

Visibility/Valence Display for 3 Subjects' Communications to Dave

Visibility/Valence: Dave to 3 Subjects

Valence of Emails

Draft Comparative Dashboards

FIG. 15
Comparative Dashboards
Plans Verse Reacts
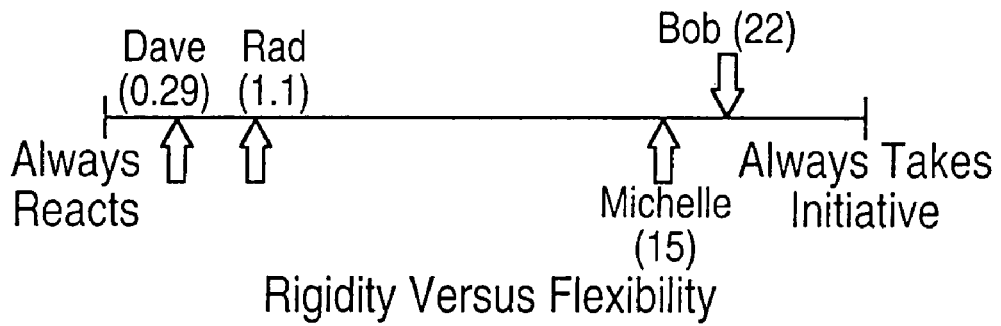
Rigidity Versus Flexibility
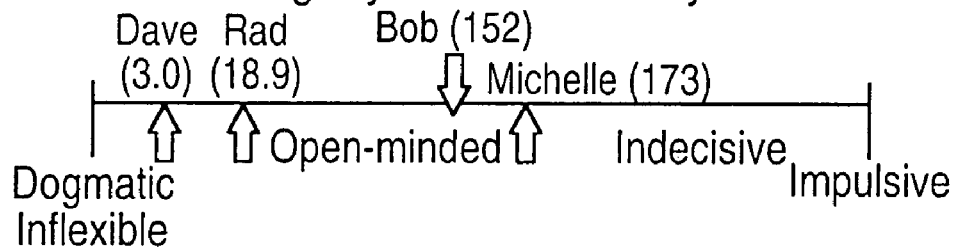
FIG. 16
Comparative Dashboards
Emphasis on Rational Versus Interpersonal
Organizational Decision-making
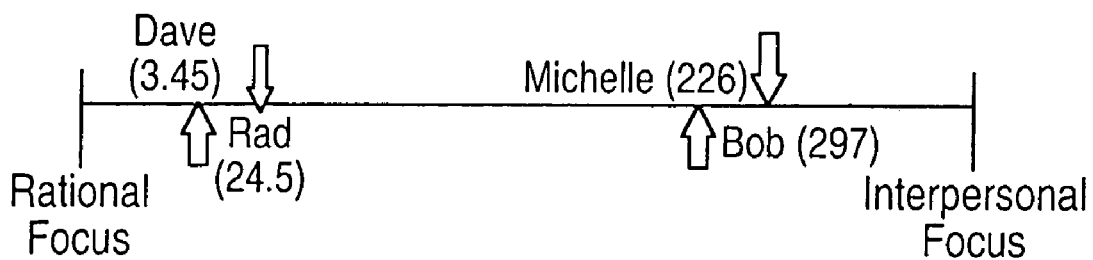

Anger Dashboard with Comparison Groups

AOL Stories: #cites by valence

SYSTEM AND METHOD FOR COMPUTERIZED PSYCHOLOGICAL CONTENT ANALYSIS OF COMPUTER AND MEDIA GENERATED COMMUNICATIONS TO PRODUCE COMMUNICATIONS MANAGEMENT SUPPORT, INDICATIONS, AND WARNINGS OF DANGEROUS BEHAVIOR, ASSESSMENT OF MEDIA IMAGES, AND PERSONNEL SELECTION SUPPORT

CROSS-REFERENCE TO RELATED APPLICATIONS

This application is a continuation-in-part of U.S. patent application Ser. No. 09/767,838 filed Jan. 24, 2001 now U.S. Pat. No. 7,058,566 and is related to U.S. Provisional Patent Application Ser. No. 60/426,014 filed Nov. 14, 2002.

BACKGROUND OF THE INVENTION

1. Field of the Invention

The present invention relates to systems and methods for analyzing computer-mediated communications, including computer generated communications and other communications that have been digitized and fed into a computer.

2. Description of the Prior Art

Psychological profiling algorithms have been developed based upon the work of Walter Weintraub. Weintraub has identified 14 critical speech categories, as listed in FIG. 1, which are believed by psychologists to reflect the operation of psychological coping mechanisms or defenses. Weintraub's opinion is that the distribution of these variables indicates the distribution of defenses in an individual and provides insight into the individual's psychological state or personality. Weintraub's and his colleague's original research dates from 1964.

This original research demonstrated differences in the distribution of these categories of speech as used by normal persons and persons with different forms of psycho-pathology, including depression, impulsiveness, delusions and compulsiveness. Weintraub profiled and compared political leaders, such as participants in the Watergate matter in 1981. In 1989, he extended his methodology for leadership profiling to the assessment and comparison of United States Presidents, including Eisenhower, Kennedy, Johnson, Nixon, Ford, Carter and Reagan.

Over the past 35 years, Weintraub's algorithms have also been used to analyze the speech and written products of leaders, to develop in-depth psychological profiles of these individuals and comparisons between them. Weintraub has also discussed the possibility of providing computerized portions of his algorithms to expedite the analytical process, but he never did so.

However, Weintraub's algorithms are not known by the public to have been applied to the evaluations of changes in an individual's psychological state over time, to the communications of normal employees in the workplace, to computer-mediated communications, e.g. email and chat, to generating a warning of a potentially dangerous change in an individual's psychological state, to self-monitoring of a person's psychological state, to assessment of the emotional tone of computer-mediated communications or media coverage, or to personnel selection.

The Weintraub algorithms quantify the number of words and relevant events in the speech categories of FIG. 1. The total word count for each category may be multiplied by a corrective figure, which is obtained by dividing 1,000 by the number of words in the sample and rounding off to three decimal places, to provide a normalized basis for comparison.

The Weintraub algorithms may be used to profile the following psychological states:
1. Indicators of Anger—
   Increases in the number of:
      words
      personal references
      negatives
      evaluators
      statements of feeling
      direct references
      rhetorical questions
      interruptions
      I
      We
   Decreases in the number of:
      qualifiers
      retractors
2. Indicators of Anxiety—
   Increases in the number of:
      retractors
      qualifiers
      expressions of feeling
      negatives
      explainers
3. Indicators of Depression—
      decreased number of words
      increased I
      increased me
      increased negative key words
      increased direct references
      increased expressions of feeling
      increased evaluators
      increased adverbial intensifiers
4. Indicators of Emotional withdrawal—
      decreased number of words
      decreased number of communications
      decreased I score
      decreased personal references
      decreased expressions of feelings
      decreased evaluators
5. Indicators of Rigidity or lack of flexibility—
      decreased number of qualifiers
      decreased number of retractors
      decreased we's
      increased I's
      decreased explainers
      increased evaluators
      increased adverbial intensifiers
6. Indicators of Impulsiveness—
      increased retractors
      increased expressions of feeling
7. Indicators of Emotional instability—
      increased I-to-We ratio
      increased adverbial intensifiers
      increased direct references
      increased expression of feelings
      increased evaluators Score Interpretations of Weintraub's psychological profiling algorithms have been suggested as follows:
   1. I scores—
      high I score—self-preoccupied
      moderate I—healthy ability to commit self in thought and action while maintaining degree of autonomy low I—avoidance of candor, intimacy, commitment
2. We scores—
   moderate score—healthy capacity to recognize and collaborate with others
   high we+low I—avoidance of intimacy and commitment
3. Me—
   high use reflects dependence and passivity
4. Negatives—
   high scores associated with stubbornness, oppositionality, anger, use of denial as defense mechanism
5. Qualifiers—
   low score—dogmatism—over-certainty, rigidity
   high score—lack of decisiveness, avoidance of commitment
   very high score—anxiety
6. Retractors—
   high score—difficulty adhering to previous decisions, impulsiveness
   moderate—mature capacity to reconsider, flexibility, openness to new possibility
   very low—dogmatism, rigidity
7. Direct References—
   high scores—difficulty with correspondence or conversation, seeking to distract or manipulate
   low or absent—shyness, aloofness, anxiety
8. Explainers—
   high—use of rationalization
   low or absent—dogmatism, rigidity
9. Expressions of Feeling—
   low score—aloofness, hesitant to share feelings, trust
   high score—insincere, histrionic
10. Evaluators—
    high scores—severe or troubled conscience, psychopathology, anger, dogmatism, rigidity
    Low scores—fear of intimacy, lack of commitment
11. Adverbial Intensifiers—
    high scores indicate histrionic personality, exaggeration, rigidity, judgmental
12. Rhetorical Questions—
    increase anger and an effort to control the dialogue
13. Interruptions—
    increased anger and an effort to dominate The specialized composite scores with relevance for personal relationships, organizational behavior and leadership remain unpublished but include:
   emotionally controlled—low anxiety and depression scores
   sensitivity to criticism—high negatives+high explainers+high I+me
   accommodating versus rivalrous—low to moderate negatives and moderate to high retractors
   oppositional—high negatives score.
   controlling in relationships—low score on negatives, feelings, evaluators, and qualifiers
   passive vs. active—high me score
   planner vs. reactor—high I+we to me ratio
   decisiveness—low to moderate qualifiers
   unrealistic—high negatives
   high need for others—high we
   high need for achievement—high I+We, low me, low qualifiers
   dependent—high me plus high evaluators, negatives, feelings
   well organized—high I+we, low me, low qualifiers, low evaluators, low feelings, low negatives
   narcissistic—high negatives+high explainers+high evaluators, high I, low qualifiers
   obsessive—high evaluators+high negatives+low retractors, low me, low qualifiers, low feelings
   paranoid—high negatives, high explainers, low retractors
   loner vs. team player—high I, low we or I to We However, Weintraubs algorithms have not been tested or validated for use with computer-mediated communications, media communications, or self-monitoring or in personnel selection. They have not been used to monitor and evaluate changes in emotional state over time, nor have they been applied to the detection and warning of at-risk states. This validation work will be required for a reliable and valid operational system. The current invention also adds multiple variables to the Weintraub categories (e.g. negative and positive feelings, negative and positive evaluators) and uses an original computerized dictionary—presently containing over 1400 words coded for emotional tone. This dictionary is continually updated as data is collected from subject samples.

Beginning in the late 1950's, Gottschalk demonstrated that the arousal associated with psychological events plays an important role in the occurrence of epileptic seizures in children and later (1955) in adults. While working at the National Institute of Mental Health, Gottschalk and his colleagues explored differences in the effects of different forms of stimulation on speech variables, such as rate, frequency, duration of pauses, grammatical categories and parts of speech (Gottschalk and Hambridge, 1955). Later, Gottschalk and his colleagues examined differences in speech between psychotic and non-psychotic patients (Gottschalk, Glessner and Hambridge, 1957). In 1958, Gottschalk conducted a time series analysis of the verbal behavior of a single psychoanalytic patient to determine any possible effects of the therapy (Hambridge and Gottschalk, 1958).

In the 1960's, Gottschalk worked with Dr. Golding Glenser at the University of Cincinnati. This work identified variations in the use of parts of speech by normal individuals according to gender and intelligence (for example, Gleser, Gottschalk and John 1959; Gottschalk and Gleser, 1964). Gottshalk and Gleser (1960) also used their content analysis method to distinguish genuine from pseudo-suicide notes. By the end of the 1960's, Gotschalk and his colleagues added new complexity to their content analysis method by moving from the analysis of individual words to more complex phrases. In 1969, Gottshalk and Gleser described a method for determining an individual's psychological state (anxiety, hostility, alienation, and disorganization) from brief samples of speech (Gottshalk and Gleser 1969). Gottschalk, Wingate and Glesner (1969), have described their content analysis scales in a scoring manual. Since 1969, Gottschalk and colleagues have applied their methods to the study of medical conditions, medications, treatment, and psychological conditions on children, adolescents and adults. This work has been summarized in Gottschalk (1995).

Gottshalk and his colleagues have computerized their content analytical scales in order to make them more efficient and more widely available to other researchers. These efforts are also described in Gottschalk (1995, pgs. 157-160).

Gottshalk and his colleagues have produced a content analytical system that can detect emotional states and changes in emotional states in individuals as a result of a wide range of psychological and medical conditions and treatments. The have also measured changes in these states in individuals over time and designed a computerized version of the system.

However, Gottschalk and his colleagues have not utilized their algorithms regarding communications by normal employees in the workplace, computer-mediated communications, e.g. email and chat, the generation of a warning of a potentially dangerous change in an individual's psychological state, or self-monitoring of a psychological state. Nor have they utilized their approach for the assessment of media images or personnel selection or screening.

Margaret Hermann, over the last 25 years, has used content analysis for psychological profiling. In 1977, Herman (with Thomas Milburn) edited an academic collection entitled "A Psychological Examination of Political Leaders", (New York Free Press 1977). This text brought together the work of psychologists and political scientists interested in the remote assessment of leadership characteristics utilizing content analysis of the leader's speech and writings. It also contains chapters by political-psychological profilers on the history and different approaches to political psychological content analysis, including Value Analysis (White 1951), Evaluation Assertion Analysis (Osgood 1959), the Psychologic (Shneidman 1961, 1963), General Inquirer (Stone, Dunphy, Smith and Ogilvie 1966), and Mode of Imagery (Winter 1973). Hermann, in 1977, in a chapter entitled, "Vocal Behavior of Negotiators in Periods of High and Low Stress: the 1965-1966 New York City Transit Negotiations," described a content analytical system that analyzed the psychological state of political leaders involved over time and in different stress states. The collection of content analytical measures drew on the previous work of psychologists, political scientists and others interested in the assessment of emotional states and their changes over time. In another chapter in the same text, she described three content analysis systems designed to assess a leader's beliefs, motives, decision-making and interpersonal style as it might affect their attitude toward foreign aid. These personal characteristics included optimism, cognitive complexity, and humanitarian ideology. The results of the study related variations in these characteristics to the policy positions taken by the leaders examined. Both Herman and her colleagues have refined and expanded the number of personal characteristics derived from content analysis of a leader's speeches or interviews and detailed their effects on a leader's foreign policy orientation and likely political behavior. The personal characteristics of nationalism, belief in one's ability to control events, need for power, need for affiliation, conceptual complexity, self-confidence, distrust of others, and task orientation have been applied to over 100 domestic and foreign political leaders, including heads of states and leaders of revolutionary and terrorist organizations.

Hermann uses scores obtained on a leader for each of the aforementioned eight personal characteristics to classify the leader in terms of six possible foreign policy orientations, including expansionist, active independent, influential, opportunist, mediator and developmental. Each of the orientation types can be expected to differ in world view, political style, decision-making process, manner of dealing with political rivals, and view of foreign policy.

Hermann has designed computerized approaches to her content analytical system. However, complexity of coding required to produce measures for many of the characteristics has limited validity and reliability of the resultant automated process.

In summary, Hermann has designed a content analysis system to assess the motives, beliefs, decision-making and interpersonal style of political leaders. She has applied this system to the in-depth profiling of subjects, comparison with other leaders, and the assessment of the dynamics of leadership groups determined by member differences. She has also used the system to analyze a leader's reaction to distress.

However, Herman has not applied her system to the communications of normal employees in the workplace, to computer-mediated communications, e.g. email and chat, to media communications, to generating a warning of a potentially dangerous change in an individual's psychological state; to self-monitoring of a psychological state or assessment of media images or to management of computer-mediated communications or personnel selection issues.

Another measure of psychological state is described in Mehrabian and Wiener (1966) which is identified herein as "Psychological Distance". Psychological distance is an emotional state expressed by the speaker toward a target, individual or group. Because the speaker normally unconsciously selects the semantic structures used to calculate psychological distance, it is an excellent measure of "covert" attitude. When a speaker's covert attitude, as measured by psychological distances, is compared with overt content of a speaker's remarks (the number of negative, positive or neutral words associated with the name of an individual or group), it becomes a reliable measure of deception or bluffing. For example, if the overt attitude toward the person or group is positive and the covert attitude is negative, this is an indicator of deception. If the covert attitude towards the group or individual is more positive than the overt attitude, this is an indicator of bluffing.

Psychological distance is scored according to the following guidelines. First, each reference by the speaker to the target is identified. Second, the word structures around the reference to the target are evaluated for the presence or absence of each of the nine conditions below. Third, for each time one of these nine conditions is present, a single score is received. Fourth, for each communication, an average psychological distance score is constructed by taking the number of references to the target divided by the number of points received in the communication across all references to the target. This score is usually between one and nine with the higher score indicating the presence of greater hostility or psychological distance.

Psychological Distance Coding Guideline

1. Spatial: the communicator refers to the object of communication using demonstrative pronouns such as "that" or "those." E.g. "those people need help" versus "these people need help."

2. Temporal: the communicator's relationship with the object of communication is either temporally past or future. E.g., "X has been showing me his house" versus "X is showing me his house."

3. Passivity: the relationship between the communicator and the object of communication is imposed on either or both of them. E.g., "I have to see" versus "I want to see X."

4. Unilaterally: the relationship between communicator and the object of communication is not mutually determined. E.g., "I am dancing with X" versus "X and I are dancing."

5. Possibility: the relationship between the communicator and the object of communication is possible rather than actual. E.g., "I could see X" versus "I want to see X."

6. Part (of Communicator): only a part, aspect, or characteristic of the communicator is involved in the relationship with the object of communication. E.g., "My thoughts are about X" versus "I am thinking of X."

7. Object (Part of Object): only a part, aspect, or characteristic of the object of communication is involved in the relationship with the communicator. E.g., "I am concerned about X's future" versus "I am concerned about X."

8. Class (of Communicator): a group of people who include the communicator is related to the object of communication. E.g., "X came to visit us" versus "X came to visit me."

9. Class (of Object): the object of communication is related to as a group of objects, which includes the object of communication, e.g., "I visited X and his wife" versus "I visited X."

However, Mehrabian and Wiener never computerized their system or applied their measure of psychological distance to computer-generated communications, detecting changes in employee groups over time, self-monitoring, assessment of media coverage, or personnel selection issues.

In December 1999, at pages 43-44, in Security Management, it was stated:

"The [inventor's] firm, has developed psycho-linguistic measures sensitive to changes in an employee's psychological state indicative of increased risk. In the case of the employee who abruptly changes tone in his email messages, post hoc use of these measures detected both the employee's initial disgruntlement and the contrast between his overt and covert activities. Had these automated measures been monitored by security, this incident might have been prevented".

FIGS. 2-5 illustrate slides presented by the present inventor at conferences on May 12, 1999, Jun. 17, 1999, Jul. 28, 1999, and Oct. 20, 1999 to persons involved with the security industry. The slides illustrate analysis of the electronic mail messages of an actual perpetrator of a computer crime which occurred several months after the e-mail messages were generated. The mean prior values of the number of "negatives", as illustrated in FIG. 2, the number of "evaluators" as illustrated in FIG. 3, the "number of words per email", as illustrated in FIG. 4, and the "number of alert phrases" as illustrated in FIG. 5 were compared to the values obtained from analysis of an electronic mail message prior to and associated with the crime in question. The increase over the mean values was discussed as indicating the risk of the criminal activity in question. The slides of FIGS. 2-5 represent the inventor's analysis after the crime occurred of emails of the perpetrator of the crime in question and were not produced at the time of the crime and were not produced by the present invention. As noted above, the categories of evaluators and alert phrases have been modified and expanded since this presentation.

FIG. 6 illustrates a slide presented by the present inventor at the aforementioned conferences analyzing continued covert hostility or psychological distance over time. As time passed, the criminal whose activities are analyzed above in FIGS. 2-5 deceived his supervisor with "charming pleasantries" as the attack was prepared. Prior art email screening techniques would also have been deceived by the activities of the criminal. As is shown in FIG. 6, a continued high degree of psychological distance was exhibited in emails after the plan of the attack was occurring. This graph was produced by the analysis of the inventor, was not produced by an analysis of the criminal's activity as events unfolded, and was not produced with the present invention.

FIG. 7 illustrates another slide provided by the present inventor at the aforementioned conferences illustrating indicators of psychological distance versus overt attitude consistent with deception. Again, as is seen, the aforementioned conduct of the prior art of FIGS. 2-6 shows a drop in overt hostility from three months to two weeks prior to the crime which deceived the criminal's supervisor, while the analysis, as depicted in FIG. 6, shows a more or less constant continued covert hostility. The graph of FIG. 7 was produced by the present inventor's analysis and was not produced with the present invention.

Email-monitoring software for the securities industry has been developed as a result of a United States Securities and Exchange Commission order that brokerage houses monitor their sales force for illegal sales practices. This software detects key words indicative of potential trading sales violations.

As a result of increased employee use of information technology, non-psychological systems of employee monitoring have emerged which are designed to protect companies from employee misuse or other threats. These systems are operated by companies to monitor employee use of information technology to detect patterns involving unauthorized visits to internet sites, errors in the use of software requiring additional training, and visits by email or other communications to or from unauthorized sites within and external to the organization.

In addition, systems exist to detect occurrence of "keywords" indicative of possible violations of law (the above-referenced security industries practice) and regulations or the existence of possible security violations.

Other systems screen incoming and outgoing communications for the existence of dangerous viruses and/or other destructive content. However, none of these systems currently assesses the psychological tone of computerized communications, the characteristics of authors of these communications, or the psychological state of an employee to generate an indicator of risk, or use these results for the purpose of improved management of communications and relationships. Nor are these systems utilized to evaluate the psychological content of media coverage or as an aid in personnel selection.

In 1984 Jarol Manheim and Robert Albritton published an article in the *American Political Science Review* entitled "Changing National Images: International Public Relations and Media Agenda Setting." In the article the authors proposed the assessment of the media image of a nation according to several criteria, including mean insertions per month (the number of times the nation is mentioned in the media) and the percent of all insertions which were positive (page 654). This scheme was used to determine the impact of the efforts of public relations firms on the media image of target nations by tracking the number of insertions and the percent of insertions which were positive before and after the public relations firm's efforts.

The current invention utilizes a related scheme to measure the quantity and emotional tone of communications. However, in addition to the number of communications, the current invention utilizes the length, frequency per time period and other characteristics of the communications. In addition to the percent of insertions which are positive, the current invention initially examines the percent which are positive and negative. Instead of coding the percent positive by observation and hand, the current invention automatically codes the content of the communications in a more complex fashion utilizing psychological content analysis categories such as negative and positive feelings, negative and positive evaluators and negatives. The user can then examine the actual content associated with this coding to determine the content associated with the emotional tone. In addition, the authors never applied their scheme to the computerized communications of individuals, changes in the emotional tone of these communications over time, support for managing these media- and computer-based relationships, monitoring and assessing potential risk from an individual's psychological state, or personnel selection processes.

SUMMARY OF THE INVENTION

The present invention is a method of and system for computerized psychological content analysis of computer and media generated communications which provide real time analysis and output communications to facilitate a user's evaluation of the frequency, psychological tone and psychological characteristics of the contents from an author contained in a communication in order to assist the user in managing these relationships, a user's evaluation of the frequency, psychological tone and psychological characteristics contained in the user's own communications (self-monitoring) to support improved relationship management, organizational and individual actions when a programmed and selectable psychological state of an author who originates or receives computer-mediated communications is detected to which a responsive action should be taken. As a result, corrective action to an individual's projected course of behavior or the content of a proposed computer mediated communication can be taken to lessen or eliminate that behavior to enhance the relationship and safety and the operation of an organization to which the author is affiliated, or to provide the author or someone else with the ability to alter the effect a computer mediated communication will have when transmitted. A user's assessment of the media image of a person, group, organization or idea in terms of frequency or visibility and emotional tone or valence can be analyzed in order to allow the user to take specific corrective actions. Likewise, a user can analyze the psychological characteristics of an individual producing original application materials or other materials used in the application process in an effort to obtain admission or access to an organization, group or individual (e.g. a job, an educational program, or membership in a club or society, or social involvement with an individual).

At least one computer or media generated communication produced by or received by an author is collected; the collected communication is parsed to identify categories of information therein; and the categories of information are processed with at least one analysis to quantify at least one type of information in each category, such as specific words and word phrases which provide information about psychological state, attitudes, and characteristics of the author and which are sensitive indicators of the changes in the psychological state, attitudes or characteristics of the author. An output communication is generated according to user specifications, as selected, based on the quantification of at least one type of information for at least one category differing from a reference for the at least one category by at least a criteria involving a psychological state, attitude or characteristic of the author in response to which it would be wise or beneficial to take a responsive action to modify the relationship or image, to intervene to avoid increased risk, or to include or exclude from entry into a relationship, membership or affiliation. The content of the output communication and the criteria are programmable to define the desired descriptions of the psychological states, attitudes and characteristics, changes in these measures, and determination of when an action should be taken in response to the psychological state. In cases where the change in psychological state involves an increased risk of dangerous behavior, a suggested action (a warning, counseling or otherwise) to be taken in response to the psychological state is also generated. A plurality of computer-mediated communications generated over a period of time may be collected, parsed and processed to generate the reference of the at least one type of information for each category. A more recent computer mediated communication may be collected and parsed to quantify the at least one type of information therein for each category, with the output communication being generated when a comparison of the reference and the quantification of the current computer mediated communication for at least one category reveals a change which differs from the reference from the at least one category by the criteria.

The plurality of analyses may comprise a psychological profiling algorithm which provides an indication of a psychological state of the author of the analyzed communication, at least one key word algorithm which processes any phrases and/or threatening acts to further identify a psychological state, attitude or characteristic of the author and how the author may react to the identified psychological state, and at least one communication characteristic algorithm which analyzes characteristics of the at least one computer mediated communication to further identify a psychological state and/or at least one possible action of the author.

The output communication may be programmed to be varied in nature to address diverse applications of the invention. The programming of the content of the output communication and the actions that should be taken permits users of the invention to customize the criteria for screening computer-mediated communications to detect those computer-mediated communications which the user deems important enough to provide a responsive action and further the nature of the action to be taken, such as modifying communication with the author of the analyzed communication, issuing a written warning, or invoking psychological counseling, so as to minimize or eliminate disruptive or dangerous situations. For example, the output communication may be a warning that the analyzed communication contains high levels of negativity which could damage a potential relationship, that there has been a significant increase in the percentage of media coverage which is negative, that the applicant has psychological characteristics that have been selected by the user for exclusion from admission, or in the case of potentially dangerous behavior, that the psychological state of the author of the analyzed communication portrays a significant increase in anger and that experts should be consulted to avoid escalation and danger. The programmed criteria for generating the warning or other feedback are selected by the user. For example, the warning may be generated only if a significant quantification of words of at least one computer mediated communication produced by or received by the author fall within identified categories of information, or if a significant change over time between an average, mean or other calculation or otherwise quantification of previous computer mediated communications received or prepared by the author and a more recent computer-mediated communication is detected.

In response to detection of that condition, a qualified professional may be automatically contacted by telephone, email or otherwise and assigned to assess the psychological state, attitudes or characteristics of the author reflected in at least one computer mediated communication. The professional may be given the option to review the data generated from the at least one computer mediated communication, determine what actions should be taken, or in the case of risk of violence, determine if a warning should be given, and to further conduct analysis of the change detected to determine its significance. This may be done with or without actual review of the content of the message. If actual review of the data is required by the professional, access to the database storing the results of the quantification of the at least one type of information in each category of review may be provided online or otherwise.

User's of the invention will have options, including monitoring designated categories of individuals, communications, and employees, monitoring employees at risk or under suspension, and general monitoring.

For example, in organizations sensitive positions of trust exist where the employee has the capacity to significantly damage the organization. For example, system administrators running a bank's on-line customer service operations or other information technology have the capacity to substantially damage the bank at will. Therefore, it is desirable that administrators having responsibility for critical business infrastructure be subject to higher levels of monitoring.

The invention permits the user to program the criteria involving a psychological state of the author and the content of the output communication. Different levels of monitoring accompanied with output communications designed specifically for the sensitivity of author's positions are selectable. For example, accountant's have different access to damage a company than do technical support staff, such as information technology professionals, which differences are reflected in the programming. Determination of the criteria when the content of computer-mediated communications exceeds the standard of review are also programmable.

Employees at risk or under suspension may include individuals on probation due to psychological or behavioral difficulties that do not yet merit removal from the workplace or individuals who are returning from leave or rehabilitation after removal due to these difficulties. This type of employee may include individuals under investigation for a violation.

A self-monitoring embodiment uses the psychological profiling algorithms discussed above and below to produce graphics or tabular ratings of the content of a computer mediated communication, scoring for emotional tone, psychological state or psychological characteristics. Thereafter, the embodiment produces recommendations for corrective actions to change the emotional tone, psychological state, or characteristics which permit the author to again use the psychological profiling algorithms on the changed computer mediated communication to check for improvement in a desired programmable measure.

A method of computer analysis of computer-mediated communications in accordance with the invention includes collecting at least one computer mediated communication produced by or received by an author, parsing the communication to identify categories of information therein, processing the categories of information with at least one analysis to quantify at least one type of information in each category, and generating an output communication when a difference between the quantification of at least one type of information for at least one category and a reference for the at least one category is detected involving a psychological state, attitude or psychological characteristic of the author to which a responsive action should be taken, the at least one category being programmable to define a psychological state, attitude or characteristic in response to which an action should be taken and possible actions that may be taken in response to the defined psychological state.

The method further may include a plurality of computer-mediated communications generated over a period of time which are collected, parsed and processed to generate the reference of the at least one type of information for each category, collecting, parsing and processing a more recent computer mediated communication to quantify the at least one type of information therein for each category, and generating an output communication when the difference between the reference of at least one category and the quantification of the current computer mediated communication for the at least one category is detected involving a psychological state, attitude or characteristic of the author to which the responsive action should be taken. Only one computer mediated communication needs to be collected, parsed and processed.

The output communication may indicate that the author or his or her communication should be studied. One or more analyses may be used to process the categories of information, with the analyses including at least one psychological profiling algorithm which provides an indication of a psychological state, attitude or characteristics of the author, at least one key word algorithm which processes any phrases and/or threatening acts to further identify a psychological state of the author and how the author may react to the identified psychological state, attitude or characteristic, and at least one communication characteristic algorithm which analyzes characteristics of the at least one computer mediated or media generated communication to identify a psychological state, attitude or characteristic and/or at least one possible action of the author.

The at least one computer mediated communication may be collected by an individual, an organization to which the author is affiliated or is seeking affiliation, or a consumer of media services; and the output communication may be present on a system of the individual or the organization and is directed to or from the individual or organization. Each reference may be set by the individual or organization. Only one computer mediated communication needs to be collected by an individual or organization to which the author is affiliated or in communication with; and the output communication may be directed to the individual user or the organization and pertains to further action to be taken regarding the author. Each reference may be static and indicative that a psychological state, attitude or characteristic of the author is of interest or concern to the individual or organization.

The collected at least one computer mediated or media generated communication may be email, chat from a chat room, website information collected from a website, or transcribed media coverage. The output communication may assess a psychological state, attitude or characteristic and the associated problems or risks posed by the author, based upon the at least one computer mediated communication produced or received by the author. The author may be affiliated with an organization and the output communication may pertain to a course of action to be taken by the organization which collected the at least one computer mediated communication authored or received by the author.

The output communication may be about the author, and the output communication may be generated in response to processing of the reference for the at least one psychological profiling algorithm and the quantification produced by the psychological profiling algorithm, may be generated in response to processing of the reference for the at least one key word algorithm and the quantification produced by the at least one key word algorithm, or may be generated in response to a comparison of the reference for the at least one communication characteristic algorithm and the quantification produced by the at least one communication characteristic algorithm. The output communication may relate to at least one of a psychological state, attitude or characteristic of the author represented in the at least one computer or media generated communication and an investigation of the psychological status of the author represented by the at least one computer mediated communication.

The at least one psychological profiling algorithm may quantify at least one of words written in bold face words written in italics, profanity or email symbols in an alert phrase. The at least one psychological profiling algorithm may quantify the words, types of words, phrases, or subjects I, we, me, negatives, quantifiers, retractors, direct references, explainers, negative and positive expressions of feeling, negative and positive evaluators, adverbial intensifiers, rhetorical questions, interruptions, interrogatives, imperatives, and psychological distance. The at least one psychological profiling algorithm produces an assessment of a psychological state, attitudes, and characteristics of the author. The psychological state of the author may be at least one of anger, anxiety, depression, emotional withdrawal, lack of flexibility, impulsiveness, and emotional stability. The psychological attitudes of the author may be represented by at least one of negative or positive evaluators and feelings, negatives, psychological distance, and frequency of communication. The psychological characteristics of the author may be represented by at least one of aloof versus expressive, loner versus team player, plans versus reacts, rigid versus flexible, task versus morale oriented, cognitive complexity, sensitivity to criticism, controlling, dependent, and organized.

The at least one key word algorithm may provide an interpretation of the psychological state and/or risk of at least one of or a combination of the words, phrases and subjects represented by the at least one computer mediated communication. The at least one key word algorithm may quantify phrases and/or threatening acts to identify a psychological state. The phrases and/or threatening acts may involve at least one of anger, victimization, grief, threats, or accusations. The at least one key word algorithm may provide information regarding at least one of author attitude, actions toward individuals, at least one organization and at least one organizational interest. The message characteristics algorithms of the at least one computer mediated communication may include at least one of the following items of information about the at least one computer mediated communication: number of words, time of day, writing time, number of words per minute, recipient, spelling errors, grammatical errors, words per sentence, and communication rate in terms of the number of computer-mediated communications per hour or day. In the self-monitoring version, the author may use the output communication to alter the at least one computer mediated communication. The altering of the at least one computer mediated communication may modify a psychological state, attitude or characteristic reflected in the at least one computer mediated communication in a manner desired by the author.

A communications manager embodiment uses the psychological profiling algorithms discussed above and below to produce graphics or tabular ratings of the content of a computer mediated communication, scoring for emotional tone, frequency of communication and psychological characteristics of the author(s). This embodiment collects communications from authors of incoming messages and uses the psychological profiling algorithms to calculate the emotional tone of the communications on a scale ranging from negative, to neutral to positive. This embodiment also collects and analyzes information regarding the incoming communication relating to the frequency, and length of communication. These two characteristics of the communication are then arrayed in a graphic or tabular format for the user in order to distinguish the amount or frequency of communication and the emotional tone of communication from a specific author. This information may be calculated for individual communications from an author or for multiple communications from the same author. These results may be displayed in user-specified formats, such as changes in the frequency and emotional tone of multiple communications from an author over time, or in summary format, displaying the number of communications and the average emotional tone across communications. The user may also select to display these values for any number of incoming authors in order to compare his or her communication across multiple incoming authors. This characteristic will allow the user to highlight the importance (in terms of frequency) and quality (in terms of emotional tone) of his or her communications across multiple incoming authors in order to analyze and improve selected relationships.

This embodiment also allows the user to analyze the characteristics of the incoming authors' communications to determine the specific frequency of specific word categories that are contributing to the emotional tone of the incoming authors' communication.

This embodiment also allows the user to assess specific psychological characteristics of the incoming author in order to improve his or her communication with the incoming author. These psychological characteristics include, but are not limited to aloof versus expressive, loner versus team player, plans versus reacts, rigid versus flexible, task versus morale oriented, cognitive complexity, sensitivity to criticism, controlling, dependent, and organized.

A system which provides computer analysis of computer-mediated communications in accordance with the invention includes a computer system having at least one processor, a database coupled to the at least one processor, and an input which collects at least one computer mediated communication produced by or received by an author, and having a parser, executed by the at least one processor, which parses the collected communication to identify categories of information therein. The processor performs at least one analysis of one of the categories of information to quantify at least one type of information in each analyzed category which is stored in the database and generates an output communication when a difference between the quantification of at least one type of information for at least one category and a reference for the at least one category is detected involving a psychological state of the author of the collected communication to which a responsive action should be taken, with content of the output communication and the at least one category being programmable to define a psychological state in response to which an action should be taken and the action that should be taken in response to the defined psychological state. The at least one analysis may be at least one algorithm. The at least one analysis may comprise at least one of a psychological profiling algorithm which provides an indication of a psychological state of the author, at least one key word algorithm which processes any phrases and/or threatening acts to further identify a psychological state of the author and how the author may react to the identified psychological state, and at least one communication or message characteristic algorithm which analyzes the computer mediated communication related to the psychological state and/or at least one possible action of the author. A plurality of analyses may be performed, each of which is an algorithm, and the plurality of analyses may comprise a psychological profiling algorithm which provides an indication of a psychological state of the author, at least one key word algorithm which processes any phrases and/or threatening acts to further identify a psychological state of the author and how the author may react to the identified psychological state, and at least one communication characteristic algorithm which analyzes characteristics of the at least one computer mediated communication to identify a psychological state and/or at least one possible action of the author. The output communication may be generated by the processor by a report generator program which generates a report pertaining to the author. The input may be coupled to a communication system of an organization to which the author is affiliated and which collects the at least one computer mediated communication produced or received by the author, and the output communication may be directed to the organization indicating that at least one of an investigation and corrective action should be considered relative to the author. In the self-monitoring version, the author may use the output communication to alter the computer mediated communication. The altering of the computer-mediated communication may modify a psychological state reflected in the communication in a manner desired by the author.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

FIG. 1 illustrates the criteria utilized by Walter Weintraub to identify and count the occurrence of words and word characteristics to determine psychological states;

FIGS. 11-18 illustrate outputs from a communications manager embodiment of the present invention.

DESCRIPTION OF THE PREFERRED EMBODIMENTS

Figure 2:
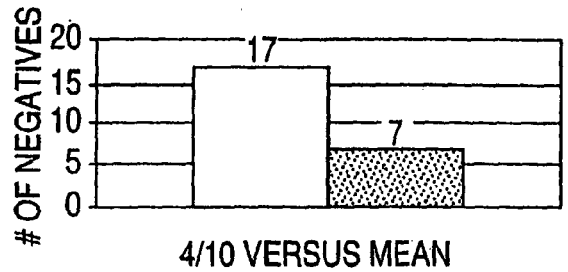
FIGS. 2-7 illustrate slides presented by the present inventor at conferences representing his analysis of electronic mail messages, after the occurrence of a crime, authored by the criminal before and during the time of the criminal activity.
Figure 3:
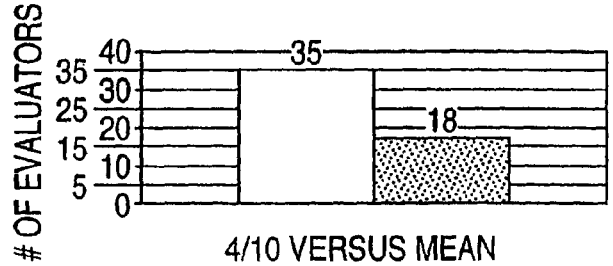
Figure 4:
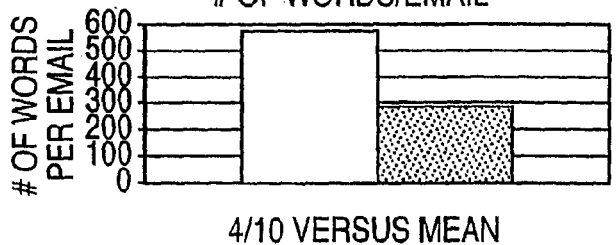
Figure 5:
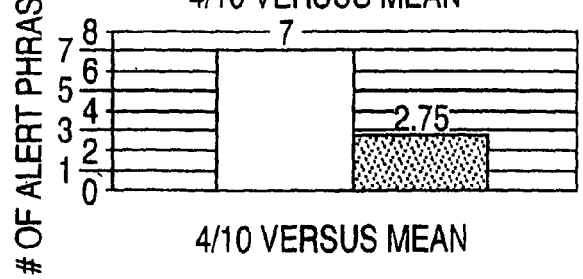
Figure 6:
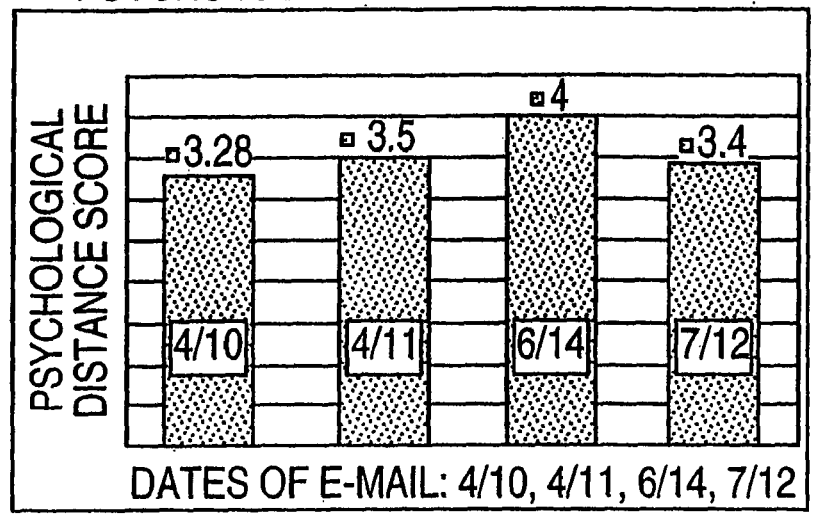
Figure 7:
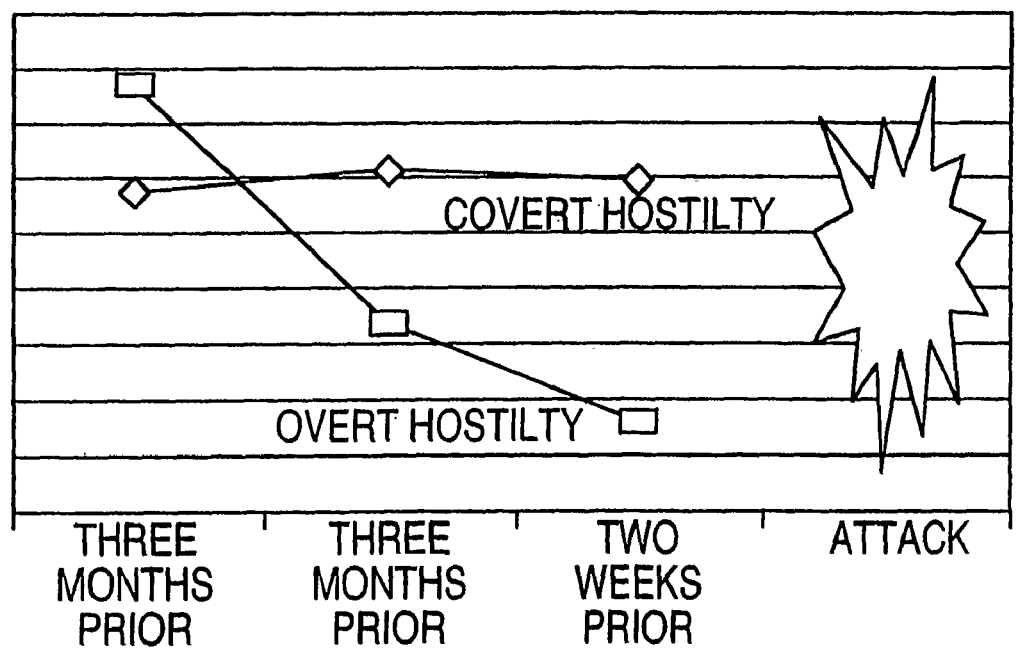
Figure 8:
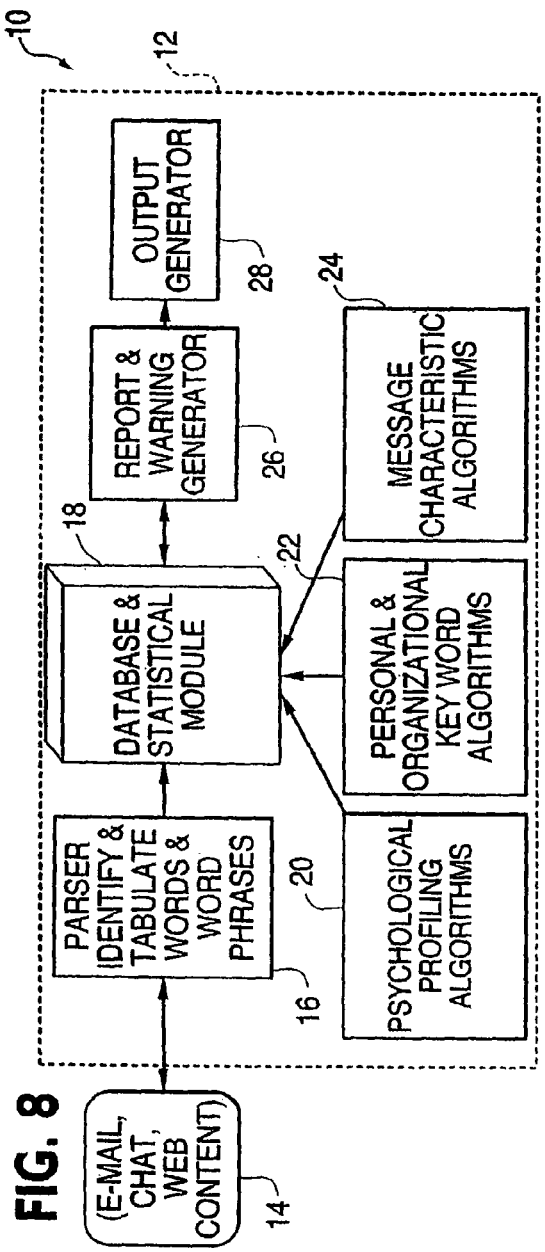
FIG. 8 illustrates a block diagram of a first embodiment of a computer system in accordance with the present invention utilized to analyze computer-mediated communications to produce output communications, such as warnings to organizations or groups to which an author of the computer-mediated communications is affiliated.

FIG. 8 illustrates a first embodiment 10 of a computer system in accordance with the present invention which is implemented in one or more processors 12 to detect, monitor and warn of the occurrence of psychological states, such as at risk psychological states, in computer-mediated communications of authors who transmit or receive computer-mediated communications, such as, but not limited to, email, chat, website content, etc. Computer-mediated communications have been recognized in the literature as having characteristics that are different than those of other forms of communication such as speech or publications. The first embodiment 10 is applicable to a wide range of applications involving group associations, such as companies, for whom an author of computer-mediated communications works or provides services. The at least one processor 12 is typically located on the site of the organization with whom the author, who transmits or receives the computer-mediated communications, is affiliated, but the invention is not limited thereto. The at least one processor 12 may be a server, personal computer or otherwise. The at least one processor 12 further may be a stand alone system or part of any existing system of a company which already monitors electronic mail and/or other computer-mediated communications. By combining the present invention with an existing system which monitors computer-mediated communications, parts of the existing system, such as a part which generates output communications and reports, may perform multiple tasks, which lessens the cost when compared to a stand alone system.

A source of computer-mediated communications 14, which may be from any connection to the internet or diverse types of communication networks, or otherwise, is a source of or destination of electronic mail, chat, web content, etc., which is analyzed by the present invention. The invention applies the same analysis to computer-mediated communications which are transmitted or which are received by the author in association with the author's organization.

A group of software modules 16, 18, 20, 22, 24, 26 and 28 are executed by the at least one processor 12 as either part of a stand alone system or as part of an existing computer system containing at least one processor. These software modules implement the processes of the present invention and are fully programmable to define the criteria for conducting the analysis of the computer-mediated communications and the circumstances surrounding the generation of output communications and the content thereof.

The group of software modules includes a parser module 16 which identifies and tabulates words and word phrases present in the at least one computer mediated communication to or from source 14 to identify categories of information therein. The parser module 16 analyzes the content of each of the computer-mediated communications to or from source 14 for keywords and phrases and message characteristics which are identified, counted and recorded. The results of this analysis are forwarded to database and statistical module 18 where the aforementioned identified, counted and recorded words, phrases and message characteristics are stored in the form of a spreadsheet or otherwise that is assigned to each author being studied regardless of whether or not the author is a receiver or an originator of the computer mediated communication. The database and statistical module 18 assigns the information to specific database categories of information in preparation for analysis by the three analytical modules 20, 22 and 24. The module 20 includes at least one psychological profiling algorithm which provides an indication of a psychological state of the author. The module 22 includes at least one personal and organization keyword algorithm which processes any phrases and/or threatening acts to further identify the psychological state of the author and how the author may react to the identified psychological state. The module 24 includes at least one message characteristic algorithm which analyzes characteristics of at least one computer mediated communication (attributes of the communication, and not the meaning of the informational content thereof) to further identify a psychological state and/or at least one possible action of the author.

The modules 20, 22 and 24 apply their algorithms to the data stored in the database and statistical module 18 to quantify at least one type of information in each category of information identified by parsing the at least one computer mediated communication. The modules 20, 22 and 24 further apply their algorithms to the data contained in the database and statistical module 18 to statistically compare the results of the current computer mediated communication to a fully programmable criteria for each of the categories of information produced by each of the modules. The fully programmable criteria may be an average, mean, other calculation or other value representing past computer-mediated communications which are a reference that is compared with values obtained by use of the fully programmable criteria applied to a current computer mediated communication. Alternatively, absolute values, which are fully programmable, are used as the reference that is compared to values obtained by use of the fully programmable criteria applied to the current computer mediated communication. The absolute screening criteria are intended to indicate when a sufficient deviation exists from a normal psychological state that a warning or other output communication should be generated immediately based upon only the content of the current computer mediated communication.

When the difference between the fully programmable reference criteria and the current computer mediated communication indicates a psychological state of the author or a change therein to which a responsive action should be taken, reporting and warning generator 26 and output generator 28 generate the programmed output communication. The database and statistical module 18 works in association with report and a warning generator 26 and an output generator 28. The report and warning generator 26 and output generator 28 generate an output communication when the quantification of at least one type of information for at least one category differs from the programmed reference for the at least one category by at least a set, programmable or calculated criteria (mean, average or other calculation) indicating a psychological state in response to which a responsive action should be taken. The content of the output communication and the at least one category are programmable to provide operator control over the detection of the actual psychological state or change therein in response to which an action should be taken. The results of the analysis performed by the database and statistical module 18 are sent to the reporting and warning module 26 and then to the output generator 28 when an output communication, in accordance with the programming selected by an operator is required, such as, but not limited to, a warning to be provided to the user or agent thereof.

The module 20 containing at least one psychological profiling algorithm measures the psychological and typically the emotional state of the author especially with regard to anger, fear, depression and anxiety. The results produced by the at least one psychological profiling algorithm are sent to the reporting and warning generator 26 and output generator 28 via the database and statistical module 18.

The module 22 containing at least one personal and organizational keyword algorithm compares the number and type of alert phrases associated with specific acts contained in the current computer mediated communication to a reference, which may be either an absolute threshold limit to be applied to analysis of that communication or an average, mean, calculated or other value produced from previous computer-mediated communications. The results of the at least one personal and organizational keyword algorithm are sent via the database and statistical module 18 to the reporting and warning generator 26 and to the output generator 28 when an output is necessary.

The at least one message characteristic algorithm 24 compares the type and number of message characteristic variables in at least one computer mediated communication (not the meaning of the content of the message thereof) to a reference, which may be either an absolute limit programmed for the current communication or an average, mean, calculated or other value produced from previous communications, to determine when an output communication should be generated. The results of the at least one message characteristic algorithm 24 are sent to the report and warning generator 26 and to the output generator 28 via the database and statistical module 18.

The report and warning generator 26 and the output generator 28 function to generate an output communication when a difference between the quantification of at least one type of information for at least one category produced by modules 20, 22 and 24 and a reference is detected involving a psychological state of the author to which a responsive action should be taken. The content of the output communication and the at least one category are programmable to define a psychological state in response to which an action should be taken and the action that is to be taken in response to the defined psychological state.

The reporting and warning module 26 performs two analytical functions in addition to its reporting tasks. First, the reporting and warning module 26 examines a pattern of results provided by the at least one algorithm of the modules 20, 22 and 24 to determine what type and level of risk, if any, is present, as represented by a current computer mediated communication. Second, the reporting and warning module 26 compares the results to either the dynamic and/or static programmable criteria involving a psychological state of the communication's author under the control of a user, such as a company or other organization, to determine whether the level of risk detected in a current computer mediated communication meets warning reporting criteria for which it is desirable to produce a programmed output communication by output generator 28. The warning reporting criteria may include where, how and to whom the output communication is to be provided. If the criteria involving a psychological state of the author for reporting a warning are met, the output indicator 28 produces the aforementioned output, including the results of the analysis and recommended actions to be taken according to a programmable format selected by the user. The recommended actions may and often will include a recommendation for further, more specific analysis of the results produced by the modules 20, 22 and 24, leading to the generation of a warning by a qualified professional, such as an on-call specialist. The on-call specialist may be provided access to the database and statistical module 18 to conduct further analysis of the data generating the warning and to make further recommendations.

In examining a pattern of results provided by the modules 20, 22 and 24, the reporting and warning generator 26 executes several threat assessment algorithms. For example, a determination may be made of whether the reported changes occurred in only one of the three analytic modules. For example, in such a case there may be a significant change in the emotional state of an author detected by module 20 (e.g. increased anger) without requiring any report of alert phrases or key phrases associated with a threat of destructive action. In addition, the overall pattern of recipients and other characteristics of the author's messages (frequency, length, time of day sent, errors, etc.) analyzed by module 24 may have remained stable. The user may choose to have data on the results for each module 20, 22 and 24 reported separately and/or may choose to have the results of all three modules synthesized into a threat warning indicator which weighs the importance of any indication of the at least one type of information in any, some, or all of the three categories of information in at least one computer mediated communication. In the above example, the results of the change in emotional state could be reported alone and/or in an overall warning index. The level of warning reported by this index may be lower than warnings resulting from increases in alert phrases detected by module 22 or significant alterations in the author's pattern of message characteristics detected by module 24.

An example of a higher level of warning indication is that significant changes in two or three of the analytical modules 20, 22 and 24 are detected. For example, a significant increase in author anger and fear (according to changes in threshold levels which are the references used during determination of whether a sufficient difference exists to warrant the generation of an output) in the module 20 may be accompanied by specific references to attacks detected by module 22 on personnel or assets by veiled threats ("big surprise", "rude awakening", etc.), or by a desire for revenge which exceed the reference for the at least one criteria. In addition, this result may be accompanied by an increase in the frequency and length of the messages to a specific individual (e.g., the author's supervisor) detected in the module 24 which exceed the reference.

The warning and reporting generator 26, according to user programmed preferences, reports significant changes in each module and/or reports the existence of a significantly higher threat index synthesizing these results. In addition, in the case when changes are detected by multiple modules, the reporting and warning generator 26 automatically extracts and reports salient threat data from each category of information. In the example above, this includes information on the type of psychological changes recorded, specific threatening key words or alert phrases recorded, and the increase in the frequency and length of messages to the author's supervisor or other recipients containing these changes.

The module 20 which provides psychological profiling is derived in part from the work of Weintraub as published in 1981, 1986 and 1989 and generally as described above. The quantification procedures for the algorithms are in accordance with Weintraub's criteria but are applied to applications not discussed by Weintraub. While Weintraub's algorithms are utilized, they are applied in a new manner to a new medium (computer-mediated communications) with new subjects in the method and computer system of the invention. The use of Weintraub algorithms in a computer implementation generating real time analysis and output communication differs from their use in the prior art with regard to the subjects examined (Weintraub never applied his algorithms to employees or other normal subjects), the medium of communication examined (Weintraub applied his algorithms to speeches and interviews), computer-mediated communications including dynamic profiles (Weintraub constructed only static profiles of political leaders), and generating a warning (Weintraub never used his algorithms to produce a warning about the existence of a dangerous psychological state associated with an increased risk of an employee damaging himself, others, or the interests of the employer). Furthermore, the Weintraub algorithms have not been used in combination with key word and message characteristic algorithms in a computer implemented system generating real time analysis and output communication.

Additionally, the algorithms in module 20 include two new categories of key word phrases which are emphatics and email symbols that are quantified, in addition to the categories of Weintraub's algorithm that are quantified. Emphatics include words written in bold face or italics and profanity. Specialized email symbols include signs used to express specific emotions, such as smiling or frowning faces. These two categories represent conditions common to email which have not been considered by Weintraub because of his work being with different subjects in a different modality. In addition, as noted above, the author of the present invention has added several new categories to the Weintraub measures (e.g. positive and negative feelings and evaluators) as well as additional analytical categories contained in the other modules (Key words and message characteristics).

The module 22 executes at least one personal and organizational keyword algorithm which analyzes key words and phrases. Expressed in connection to an individual or organizational characteristic, policy, or practice, key words provide greater evidence that a potentially dangerous emotional state detected in the at least one psychological profiling algorithm may be connected to an individual or an organization. These key words or alert phrases include the categories of expressions of anger, expressions of grief, threats, and accusations. The module 22 quantifies words in these categories to generate a total score of all of the words determined to be within this category. This is compared to a reference, which may be programmed or determined from an average, mean, other calculation or otherwise from previous computer-mediated communications to determine if an output communication should be generated.

Examples of key words and alert phrases, without limitation, include anger, e.g. hate, despise or resent, garbage, screwed, unfair, protest, resist, pissed, rage, hostility, etc.; grief, e.g. loss, sad, can't help, remove, take away, forever, never the same, death, separation, move, gone, destroyed, ruined, etc.; threats, e.g. big surprise, shock, what's coming, quit, hack, fire, you'll regret, take down, get even, sue, lawsuit, publish, punish, kill, hurt, steal, etc.; and accusations, e.g. accuse, punish, set-up, arranged, conspired, planned attack, force out, demote, transfer, undermine, etc. These key words or alert phrases have been found in prior attacks by insiders. They connect an author's negative emotional state to a specific possible action toward an individual and/or organization, increasing the predictive capability of the present invention when connected with the other algorithms.

While key word analysis has previously been used, such as ordered by the Securities and Exchange Commission regarding broker email, key word analysis has not been used with respect to key words specific to employee attitudes and actions toward individuals or organization's or their interests, key words specifically derived from and tailored to insider violations involving fellow employees and organizational interests, key words collected over time from a single individual rather than a one-shot, static detection strategy that results in a warning from a single key word occurrence, or key words in combination with psychological profiling data and message characteristic indicators in a computer implemented system in order to develop a more specific sensitive, valid and reliable indicator of risk or other situations reflected in computer-mediated communications to which a responsive action is desirable.

The at least one message characteristic algorithm in the module 24 analyzes attributes of the communication itself, rather than the meaning of the content that provides psychological information. These characteristics or attributes include the number of words (depressed individuals tend to be less productive while non-depressed individuals have been shown by research to be more productive), time of day (alterations in the time of day an author chooses to communicate can have significance in that depressed or upset individuals tend to develop insomnia and experience variation in their moods according to time of day), writing time or words per minute (concentration and motor speed are extremely sensitive to changes in psychological and cognitive state, as well as the presence of psycho-active agents) (Shaw 1986-1987), with changes in words per minute therefore being a key indicator for depression, anxiety and anger, drug use or other potentially risky changes in an individual, recipient (it is important to determine whether the person to whom the subject is directing the computer mediated communication has changed, whether the number of recipients has been altered, or whether the psychological content of the message varies according to the recipient, with this information being vital to locating a source of interpersonal conflicts), spelling and grammatical errors (changes thereof are an excellent indicator of concentration, attention and cognitive integrity, all of which may be affected by stress, illness, drugs or extreme emotional states), words per sentence (abbreviation or expansion in the efficiency of communications is an indicator of psychological state, especially anger, anxiety and depression), and communications rate (communications per hour and day as an indicator of productivity, which can be affected by psychological state). These attributes had been previously measured but have not been applied to a computer implemented system in combination with psychological profiling and key word analysis to produce a warning and provide information regarding characteristics in an employee population. The module 24 quantifies variables in these categories to generate a total score of all of the data determined to be within this category which is compared to a reference, which may be a programmed absolute value or may be determined from an average, mean, or other calculation or otherwise from previous computer-mediated communications, to determine if an output communication should be generated.

Figure 9:
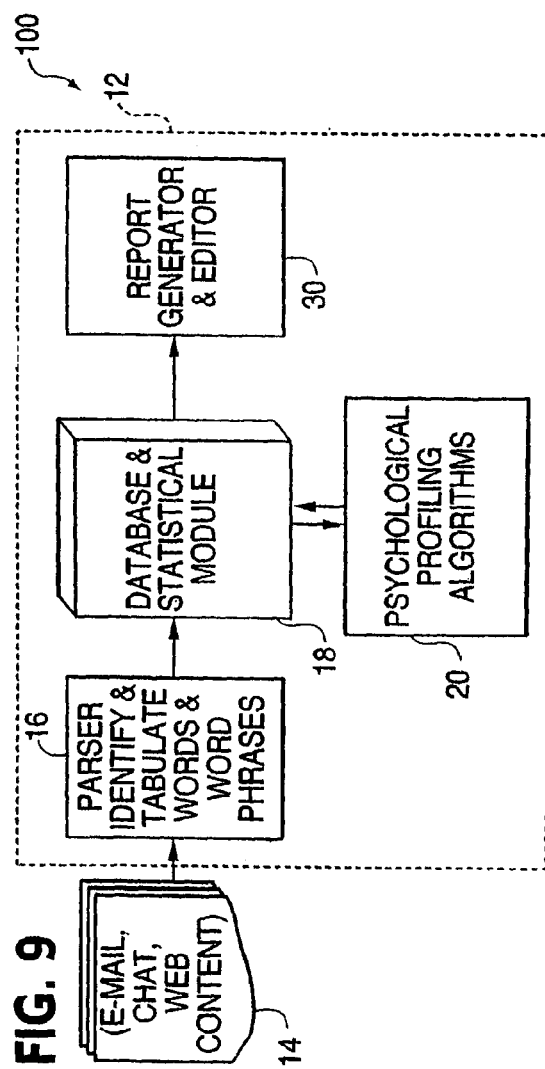
FIG. 9 illustrates a second embodiment of a computer system in accordance with the present invention used to analyze computer-mediated communications by the author thereof or another to provide recommended changes to the computer-mediated communications so as to alter the psychological state reflected therein before transmission thereof.

FIG. 9 illustrates a second embodiment 100 of a computer system in accordance with the present invention which is also implemented in one or more processors 12. The second embodiment 100 differs in functionality from the first embodiment 10 in that it is primarily, but not necessarily, used for self-monitoring by or of the author of computer-mediated communications in order to allow the author or user to assess a psychological state reflected in the author's proposed computer generated communications. The output communication is generated when a difference between the quantification of at least one type of information for the at least one category produced by the psychological profiling algorithm of module 20 and the programmable reference, or a reference obtained from an average, mean, other calculation or otherwise from previous communications, is detected involving a psychological state of the author to which a responsive action should be taken. The content of the output communication and the at least one category are programmable to define a psychological state in response to which an action should be taken and the action that is to be taken in response to a defined psychological state.

The embodiment 100 produces graphic or tabular ratings of the contents of a work product scored for emotional tone. Emotional scales for embodiment 100 include ratings of the levels of such emotions as anger or hostility, decisiveness, passivity, self-confidence, complexity, sadness or happiness, etc. After completion of a computer mediated communication, the author has the option of engaging the embodiment, much in the same way a spell or grammar checker is used, to obtain an evaluation of the communication and possible corrective action to alter the emotional tone. The default position of the system includes standard scales, but the user also has the option to select or eliminate specialized scales by programming that may be of relevance to the target audience or of personal concern.

After the ratings of the work product are complete, the embodiment 100 produces recommendations for corrections designed to increase or reduce levels of various emotions. For example, a computer mediated communication high on hostility may produce a recommendation to reduce the number of negatives while highlighting their location within the text. A computer mediated communication high on indecisiveness may recommend the reduction of the number of qualifiers and retractors, also highlighting their location in the text. The author then has the option to re-run the rating system to check for improvement in the desired fully programmable emotional scales.

A typical psychological state to which responsive action should be taken is when the content of a proposed computer-mediated communication would have a negative effect on a recipient(s). A typical suggested action is suggestions in the output communication of how to lessen the undesired impact of the proposed computer-mediated communication of the author (e.g. email). The content of the proposed computer mediated communication is typically altered to improve the desired impact of the communication. For example, the proposed output communication is designed to insure that the proposed computer mediated communication does not display excessive anger, indecisiveness, rigidity or other characteristics designated by the user as undesirable in the programming of the criteria for determining when a responsive action should be taken. The user may also utilize the embodiment 100 to assess or modify the psychological characteristics presented in a desired direction, such as to increase or decrease a negative psychological state reflected in a proposed communication. The embodiment 100 parses and assesses these characteristics and actively assists the user to alter them, through specific recommendations which are fully programmable, to provide versatility in use of the embodiment with different personalities and screening different types of communications.

The same psychological profiling algorithm 20 is used which is used in the embodiment 10 described above in association with FIG. 8. In the embodiment 100, at least one computer mediated communication is parsed and analyzed to produce a determination of the author's psychological state. Additionally, hypotheses regarding the author's psychological characteristics reflected in the computer mediated communication are determined. As the embodiment 100 gathers more data through the analysis of computer-mediated communications of a user or outside author, such communications may be stored and utilized to improve the validity of assessment of the author through use of additional data. This allows the embodiment 100 to analyze changes in psychological characteristics of the person involved, which is typically the author of the computer mediated communication, but is not limited thereto. The operation of the parser 16, database and statistical module 18 and the module 20 containing at least one psychological profiling algorithm is similar to that in embodiment 10, except for its application being designed to provide self-monitoring or monitoring of an individual without the primary beneficiary of the suggested action being an organization to which the author is affiliated.

The module 20 in the embodiment 100 utilizes the analytical algorithms to evaluate the psychological state and characteristics of the author requested by the user. This may involve analysis of a single communication to see if the quantification of the words of the computer mediated communication exceeds a programmable reference set by the user or someone else, or if a comparison of the quantification of the criteria being investigated in the current communication differs from a reference determined from one or more previous communications of the same author or different authors which are used as a basis to determine if an output communication should be generated. In addition, the psychological measures derived from the current communication may be compared to the statistical values derived from an analysis of a subset of previously authored communications or even all previously authored communications. This capability allows the user to assess changes in an author's psychological state or characteristics over time. In the self-monitoring mode of the embodiment 100, the user evaluates the effects of alterations in the content of his or her own communications.

The results of analysis performed by the module 20 are transferred through the database and statistical module 18 to the report generator and editor 30, where results are delivered to the user in a format selected and programmed by the user. In the self-monitoring mode, the user may select indices of preselected psychological characteristics such as hostility, assertiveness, flexibility, passivity, complexity, etc. The user may then query the system for the actual basis of these judgments and may obtain suggestions for altering these values. For example, if the embodiment 100 generates a hostility score of 8 on a scale of 0-10, the user is told the basis for the score, e.g. a relatively high level of negative phrases, such as not, no, never, etc. The user is then offered suggestions for lowering this score (e.g. by reducing the number of negative phrases which the system locates and identifies). After altering the suggested content, the user then may repeat the analysis of the computer mediated communication to determine the effect of editing on the emotional or psychological state reflected therein so as to permit variation in the impact of the computer mediated communication as measured by the quantification produced by the psychological profiling algorithms in the module 20.

The embodiment 100 also uses the emphatics and email symbols in module 20 described above with respect to the embodiment 10 of FIG. 8.

A range of single and composite score interpretations based upon the above-described score interpretations of Weintraub, may be utilized in a determination of the psychological state of the author with the embodiment 10 for applications such as employee monitoring for follow-up or more in-depth assessments by qualified personnel, and with the embodiment 100 to provide more specialized forms of analysis, including self-analysis.

Another algorithm which is used by the embodiments 10 and 100 to generate the output communications is Psychological Distance, as described above. This measure is derived from the work of Mehrabian and Weiner (1966).

Figure 10:
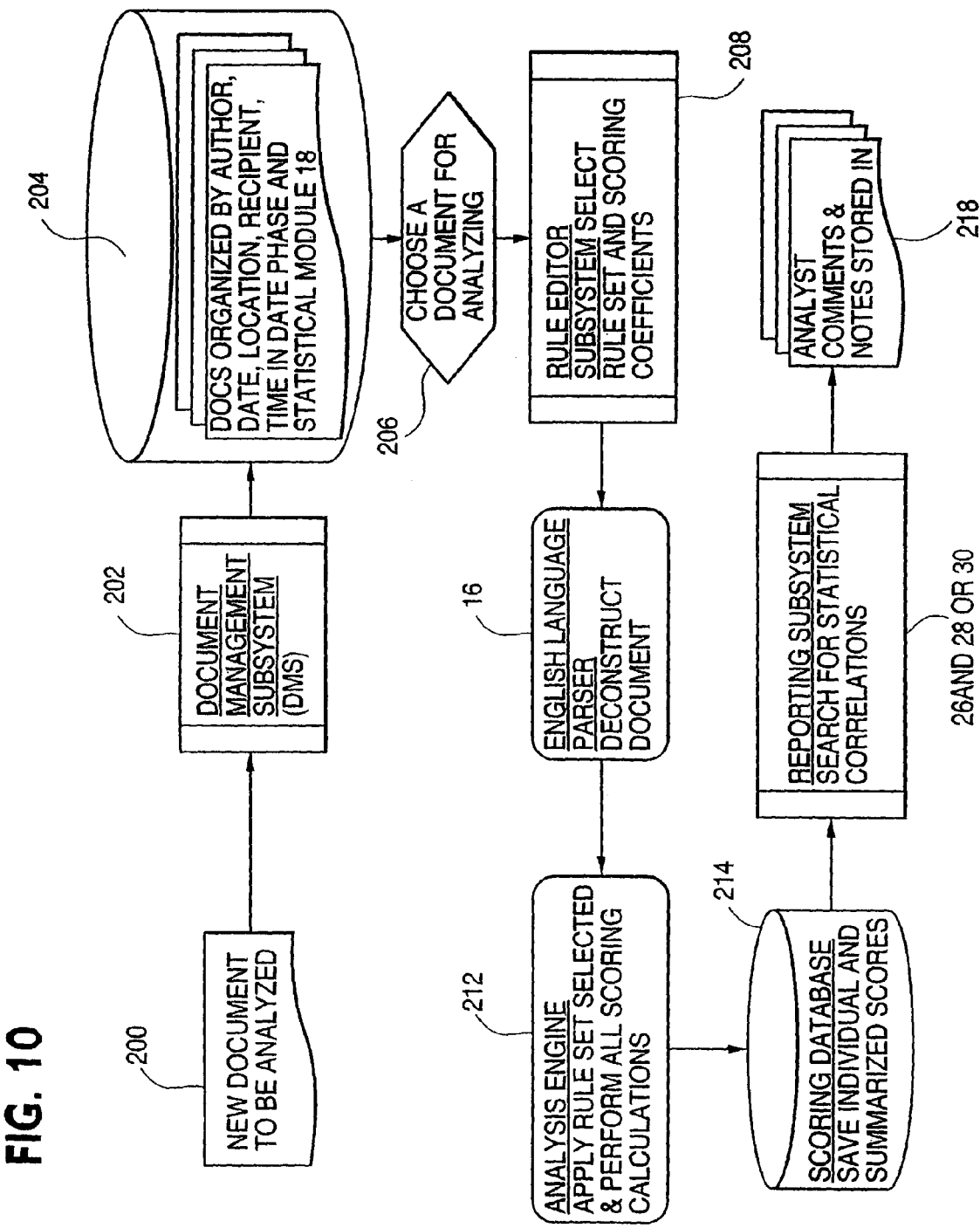
FIG. 10 illustrates a workflow associated with the first and second embodiments of FIGS. 8 and 9.

FIG. 10 illustrates a workflow of the processing performed by the at least one processor 12 of the embodiments 10 and 100 of FIGS. 8 and 9. However, it should be understood that the invention is not limited thereto. Workflow begins at 200 with a new document to be analyzed, which is a computer mediated communication. The new document, provided in digital format, is forwarded at 202 to a document management subsystem. Groups of documents are organized at 204 in a database, as indicated, so that the organization is, without limitation, by author, date, location, recipient and time. The analysis of an individual document begins at 206 where a document stored in the database 204 is selected. The selected document is forwarded at 208 to a rule editor subsystem where the user is provided selectivity of the rule set used to program the operation of the parser 16. The rule editor subsystem 208 passes the selected document to language parser 16, which may be in accordance with any well-known text analyzer, to perform the quantification as described above with respect to the modules 20, 22 and 24.

The language parser 16 deconstructs the document to identify categories of information therein, as described above for each of the categories of information analyzed by the modules 20, 22 and 24. The language parser 16 passes the deconstructed document to an analysis engine 212 to apply the selected rule set and to perform the programmed scoring calculations (quantifications) involving each of the identified categories of information, to quantify at least one type of information in each category. The results of processing of the analysis engine 212 are passed to the scoring database 214 where the individual scores are saved and summarized, such as producing the mean, average, etc. of all past computer-mediated communications used as the reference for each category so as to facilitate comparison to a current computer mediated communication. The results of the scoring database 214 are passed to the reporting and warning generator 26 and output generator 28, or to report generator and editor 30, which generates reports and communications regarding a responsive action which should be taken. Optionally, a professional, such as an analyst, is provided at 218 with the output from the reporting and warning system 26 and output generator 28 or the report generator and editor 30 to permit comments and notes of the analyst to be stored so as to provide responsive action to the results of the reports.

Figure 11:
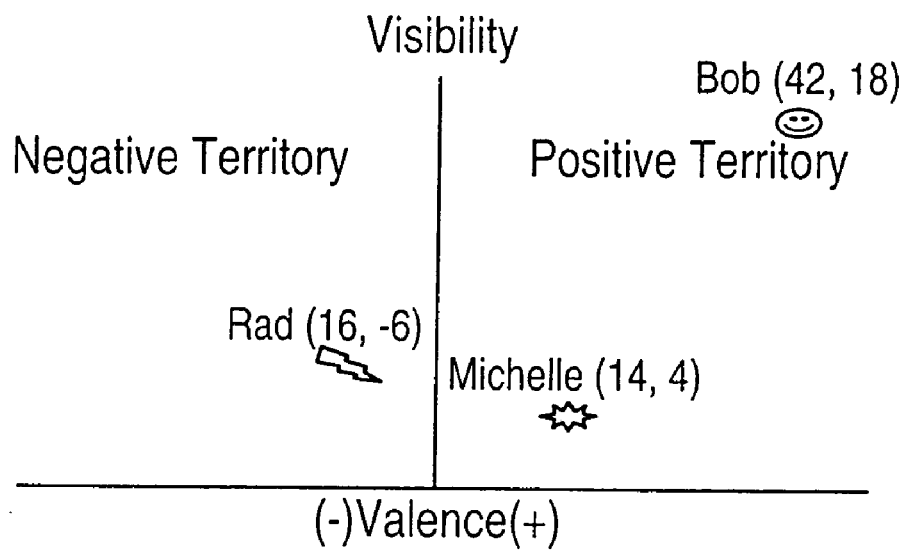

FIGS. 11-18 illustrate outputs from a communications manager embodiment. FIG. 11 displays the summary output for email received by "Dave" from three work colleagues "Rad", "Michelle" and "Bob". The data is displayed in terms of the number of emails per week and the emotional tone of the emails. In the above example, "Dave" received 16 emails from "Rad" with a mean emotional tone score of negative 6. "Dave" received 14 and 42 emails from "Michelle" and "Bob", respectively, with emotional tone scores of positive 4 and 18, respectively. This summary data immediately tells "Dave" that he has a positive relationship with "Michelle", a very positive relationship with "Bob", but that his relationship with "Rad" is much more negative.

Figure 12:
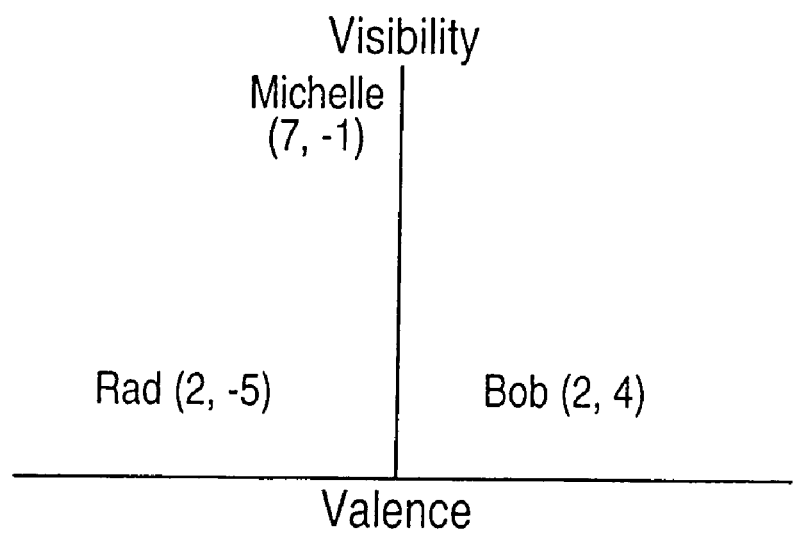

FIG. 12 displays a summary of "Dave's" weekly email communication to "Rad," "Michelle," and "Bob". "Dave" may now determine the extent to which his communications may contribute to the status of the frequency and emotional tone of his relationship with these three. The system indicates to Dave that his communications with "Rad" are even less frequent and almost as negative as "Rad's" to him. The output also indicates that his communications to Bob and Michelle are fewer than theirs to him and significantly less positive.

Figure 13:
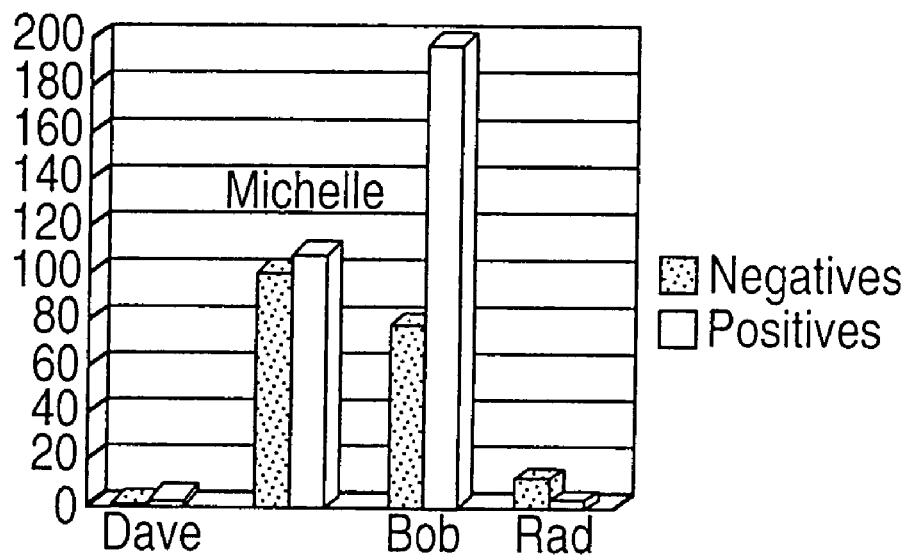

FIG. 13 summarizes the data in greater detail by utilizing the system's ability to break down the number of email by the counts of words scored negative and positive. This summary output tells "Dave" that his output is generally much lower than his colleagues, although it is somewhat similar to "Rad's". If "Dave" wishes to modify his relationships with these three individuals the system will advise him to increase his output and increase the positive versus negative valence of this output. The system will review his outgoing emails in its self-monitoring embodiment and score these emails on these variables and highlight for "Dave's" review, per his instructions, the negative words contained in his communication. A week later, Dave can re-examine the frequency and valence of his email communications with these three individuals to determine the extent of change, if any, that has been made.

Figure 14:
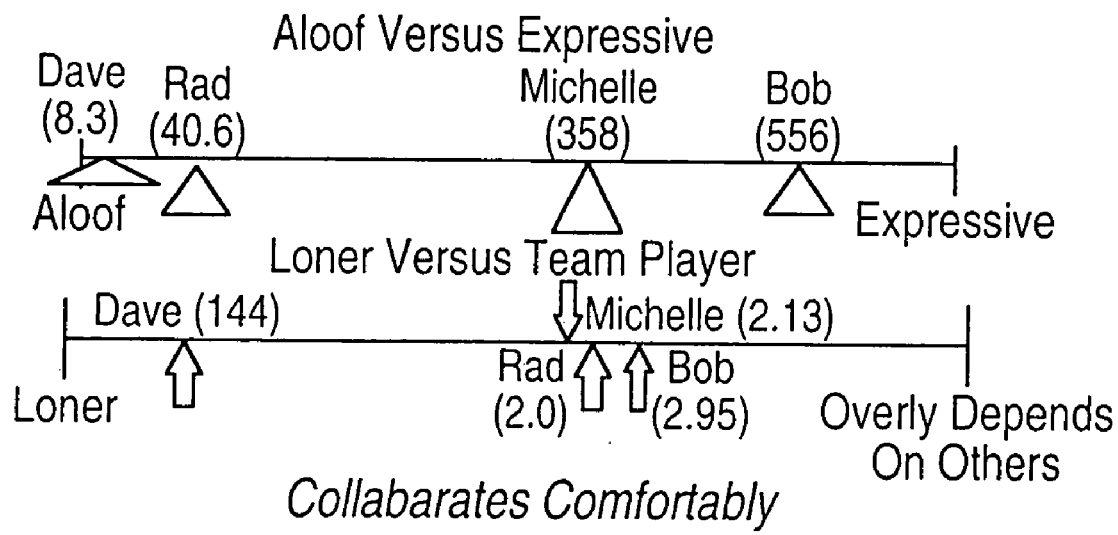

FIG. 14 provides further examples of system output designed to help the user manage his relationships through computerized communications. The upper and lower dashboards in FIG. 14 permit "Dave" to compare himself to his three colleagues in terms of the psychological characteristics of Aloof versus Expressive and Loner versus Team Player, respectively. As the upper dashboard indicates, "Dave" and "Rad" are more similar in aloofness than "Michelle" and "Bob". The system will therefore advise "Dave" to modify his communications with "Michelle" and "Bob" to become very significantly more expressive, while his communications with "Rad" need to be only moderately more expressive. The lower dashboard indicates that unlike the other three, Dave is more of a loner and less of a team player. He must therefore modify his communications (and behavior). The system will therefore review his outgoing communications with these individuals and, per his instructions, advise him to delete "loner" language (such as heavy use of "I" and "me") and increase his use of team language (such as "we," "us" and "our").

FIGS. 15 and 16 supply further examples of comparisons of "Dave" and his colleagues on other system psychological characteristic dashboards. "Dave" can use this information to help modify his relationship with these individuals. For example, the three dashboards of FIGS. 15 and 16 tell "Dave" that in his relationship with "Rad" he may wish to emphasize the need to react to events rather than to take the initiative, present his ideas with firmness and clarity representing strong, fixed beliefs, and emphasize the rational costs and benefits of proposed actions rather than the interpersonal or human factors outcomes.

A sample system output expressing these findings about "Rad" to "Dave" may include:

Plan versus React: this individual prefers to react to events, rather than take the initiative. Your dealings with this person may be more successful if you do not wait for him to come to you, rather you ask him to respond to requests, proposals or actions initiated by you or others. He may be more comfortable providing advice or feedback on actions, plans or proposals of others than initiating such activities. According to the content assessed thus far, you are similar to this person in terms of these characteristics. Therefore, in your relationship with him, you may have to make an extra effort to initiate contact and maintain communications.

Rigid versus Flexible: this individual is relatively fixed in his beliefs, ideas and attitudes. Your dealings with this individual may be more successful if you take this into account by not directly challenging his ideas and attitudes, but rather take them into account in your communications with him. Use your knowledge of his strong beliefs and feelings as a starting point for your communications and proceed from there. The content assessed thus far indicates that you are very similar to him in this respect. In your communications with him, you may therefore wish to set your own beliefs and feelings that are different from his aside, at least initially, and emphasize those areas of agreement.

Rational versus Interpersonal: this individual tends to emphasize the logical costs and benefits of plans or actions in his decision-making rather than the emotional or personal effects on individuals. He is more concerned with accomplishing tasks and performance than morale or the psychological needs of others. In your communications with him, you may wish to emphasize the logical and empirical costs and benefits of a decision over the personal or morale factors. According to the content assessed thus far, you are similar to him in this regard and may wish to take that into account in your communications with him. Your natural decision-making format may therefore work well in your communications with him.

Figure 17:
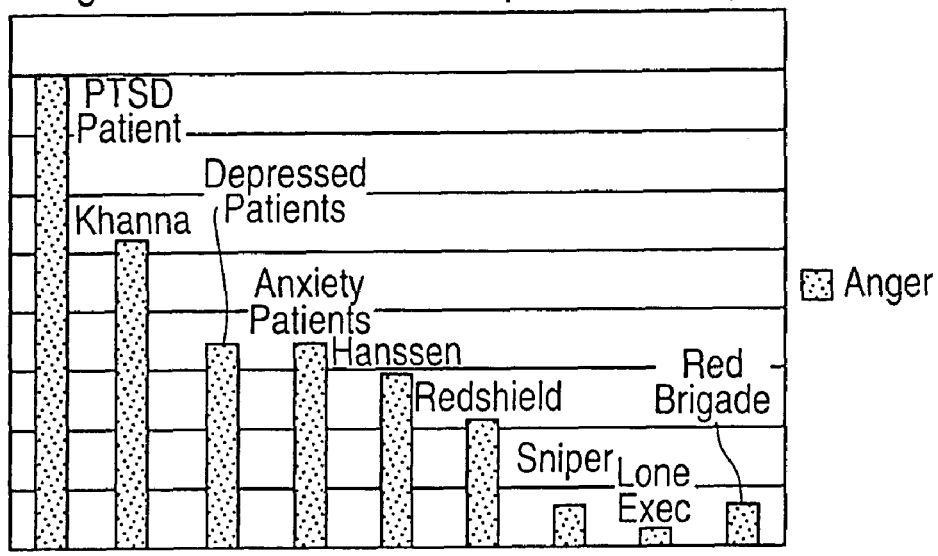

While these system dashboards compare communication authors to each other, the system also can compare the scores on psychological states, attitudes and characteristics to other criterion groups. This will be particularly important when the communications of an author are being evaluated for potential risk of dangerousness. For example, FIG. 17 compares "Dave's" email communications, labeled as "Lone Exec" on Anger to that of several comparison groups. These groups include:

The mean anger levels of a patient suffering from Post-Traumatic Stress Disorder (PTSD Patient);

The mean levels of anger of a disgruntled computer programmer's communication with his supervisor. He was convicted of sabotaging a company's servers (Khanna);

the mean anger levels of the communications of ten depressed individuals on a self-help on-line chat bulletin board on depression (Depressed Patients);

the mean anger levels for communications of 12 anxious individuals on an on-line self-help bulletin board for persons suffering from anxiety (Anxious Patients);

The mean levels of anger in the communications of Robert Hanssen, a former FBI employee convicted of espionage, with his Soviet handlers (Hanssen);

The mean levels of anger in a disgruntled employee rejected by his former lover at work just before he attacked her property (Redshield);

The level of anger in a note to police from the sniper that attacked and killed individuals in the Washington, D.C. metropolitan area in 2002 (Sniper); and The level of anger in a note from Italy's Red Brigade terrorist group threatening a foreign journalist with death if he did not leave Italy, written in 2002 (Red Brigade).

This system feature allows the user to compare the levels of emotions or psychological states or traits in authors with the same author, the user's communications, other authors for whom the user has email or criterion groups such as those above. In the embodiment used to identify and/or monitor individuals at-risk for dangerous behavior the ability to compare their scores with other individuals with proven risk and danger offers the user an advantage.

In summary, the Communications Manager embodiment allows a user to analyze and track the state of a relationship in terms of its importance or frequency of contact and emotional tone, identify and analyze problems in the relationship, understand the psychological characteristics of authors and their potential impact on the relationship, monitor, analyze and alter the user's communications content, generate tactics for changing and improving the communications with an author to improve the relationship, and measure the success of these efforts over time, while also monitoring an author for potentially risky psychological states and/or characteristics.

Figure 18:
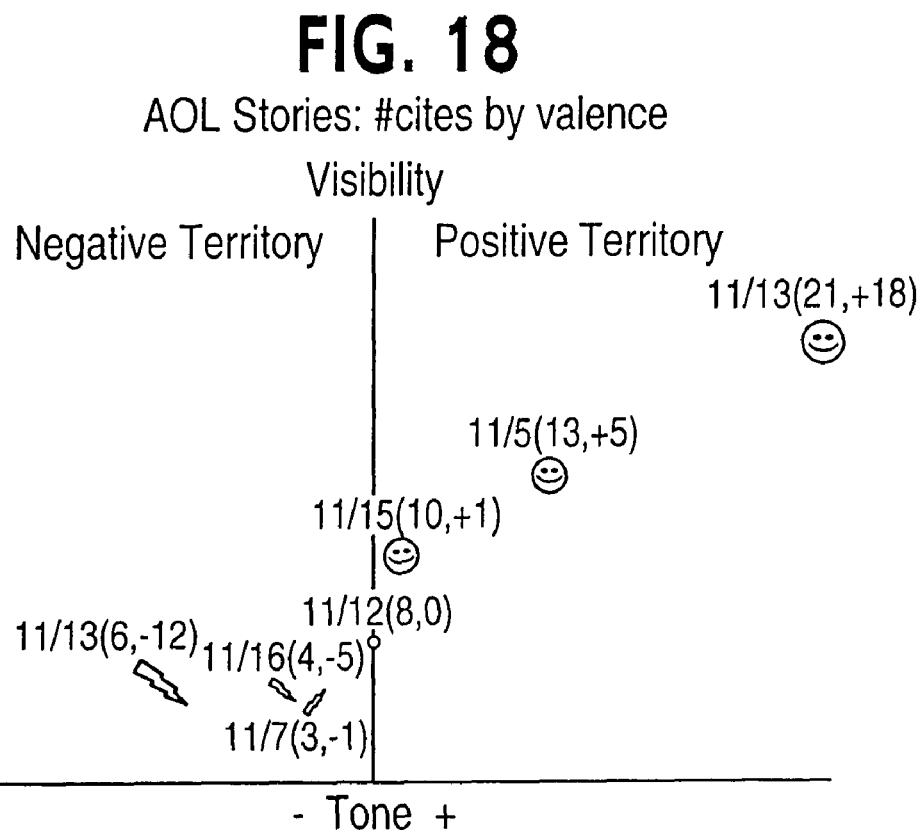

A media image assessment embodiment utilizes transcripts of audio media coverage or copies of printed or digital media coverage of a person, place, organization or idea. As in the Communications Manager embodiment, the system analyzes the content of the media communications and displays the output in terms of the frequency of the references and their emotional tone. FIG. 18 displays such information for seven stories on America On Line (AOL) from *The Washington Post* during a twelve day period in November 2002. The data in the graph portray the number of cites or references to AOL in each article (visibility) and the overall emotional tone of the citations as measured by the sum of the number of positive feelings, positive evaluators, negatives, negative feelings, and negative evaluators.

As FIG. 18 indicates, coverage of AOL varied by media author significantly during this period. For example on Nov. 13, 2002 there were two articles in the *Post* which were very different in their visibility and valence or tone. One article in the upper, right-hand side of the graph was high in visibility and positive in tone (21, +18). The other article appearing on the 13th was lower in visibility and much more negative in tone (6, −12). Users interested in this media coverage of AOL could use this system to track authors and themes by their coverage of AOL and utilize this information to construct media strategies and tactics to improve this coverage. The success of these efforts could be tracked over time using the system. For example, this embodiment could be used by a public relations firm or a communications office to track the visibility and tone of the articles by authors who were favorable toward AOL and authors negative toward AOL. It could also be used by campaign officials seeking to help political candidates or causes, This information could be used to structure communications with these authors in order to address the themes of their coverage. For example, in order to improve coverage by authors with a negative disposition toward AOL, such authors could be given information addressing their negative themes or given access to AOL personnel with expertise or interest in their concerns. Authors who are favorably disposed toward AOL could be identified and supported in their positive themes with information and access. A user could even use the Communications Manager embodiment of the system to further enhance management of these relationships. The success or failure of these efforts could then be monitored by assessment of forthcoming media coverage by these authors.

The personnel screening and selection embodiment of the invention applies the system's ability to assess an authors psychological state, attitudes and characteristics by the content of applicant essays or interviews for admission to an organization, group or relationship. In this embodiment, the individuals or organization involved may set standards for inclusion or exclusion for entry and may use the system as one approach to measure the presence, absence or extent of these characteristics. These standards may be based on the actual measured characteristics of relatively successful or unsuccessful past members or may be based on the preferences of the gatekeepers.

For example, the admissions committee of a medical residency training program recently divided the graduates of their program into successes and failures based upon faculty ratings of their ability to work with others to take advantage of the learning opportunities in the residency. They then reviewed the contents of the graduates' admission essays for measures of related abilities using the system. Table 1 below displays the results for these three measures.

TABLE 1

Characteristics of Successful Versus Unsuccessful Graduates: Rigidity Versus Flexibility, Team Player Versus Loner, and Sensitivity to the Environment

| Group: | Rigidity | Team Player | Sensitivity |
|---|---|---|---|
| Successful | 6.5 | 3.5 | 64.0 |
| Unsuccessful | 22.3 | 16.2 | 42.4 |

Using the system, the faculty's observations regarding the differences in the psychological characteristics of the successful graduates versus the unsuccessful graduates were translated into characteristics that could be detected by the system in the content of the graduates' admission essays to the residency. Rigidity versus flexibility (the lower the score the more flexible) was seen as important to a trainee's ability to adapt to new conditions, procedures, patient and staff characteristics. The ability to be a team player versus more self-centered or self-involved (the lower the score the better able to work with others) was seen as critical to a trainee's ability to collaborate with staff and faculty. Sensitivity to the environment (the higher the score the greater the sensitivity) was deemed important to a trainee's ability to detect the emotions and concerns of others and work with them successfully. As Table 1 indicates, the successful graduates versus the unsuccessful candidates performed significantly better on these measures. The residency admissions committee will now use the scores of candidates on the essay portion of their applications when they consider the relative strengths and weaknesses of technically qualified candidates for admission.

In a similar manner, individuals and groups could use their admissions and subsequent performance data to set standards for candidates for admission or exclusion from other graduate programs, jobs, private groups or even dating or social relationships.

A Case Example

This case below illustrates operation of the invention, including how the output communication appears and is applied. At the outset, emails or other computerized communications are scanned for the selected words and values utilized in the three categories 20, 22 and 24 of algorithms—psychological profiling, key words and message characteristics—as described above. These values are preferably assembled on a single spreadsheet for each email produced by a subject. As additional emails are collected, an additional spreadsheet is constructed containing mean scores and other values for all collected emails for a subject. The analytical algorithms are then applied to the data in the spreadsheets to construct critical scores.

For some of the more advanced psychological profiling variables, it is often desirable to apply a correction factor that accounts for the difference in the number of words per computer mediated communication. For example, if there is interest in determining whether a subject's error rate is changing as a function of decline in concentration and attention, it is often useful to score typing or grammatical errors per 1000 words. This correction factor is also useful when two or more different authors are being compared or an author is being compared to others within the work or peer group. However, in most comparisons of an individual over time, the number of words produced, per se, is an important indicator of a subject's psychological state and is not corrected for.

The values in Table-2 below are taken from actual emails transmitted between a computer crime perpetrator and his supervisor which are the basis for FIGS. 2-7. In this example, the invention draws from the message characteristics category to select only messages from the criminal to his supervisor. Table-2 contains two sets of actual scores that the system selects from its spreadsheets for the author to assess levels of anger—the number of negative phrases, evaluators, and alert phrases as a first score, and the number of words per email and the frequency of email messages to a selected recipient as a second score. As determined, typically in collaboration with the user, scores for other psychological characteristics may also be assessed by selectively drawing on the values in the spreadsheet from which these scores are constructed. The first column contains the mean values for six previous emails collected by the investigator three months prior to the criminal attack. The second column contains the same selected scores for an email collected on April 10$^{th}$ when the criminal's relationship with his supervisor began to deteriorate and he became noticeably disgruntled.

TABLE 2

Example Scores Generating a System Warning

|  | Mean Scores for Previous Emails | Score for April 10 Email |
|---|---|---|
| Negatives | 7 | 17 |
| Evaluators | 18 | 35 |
| Alert Phrases | 0 | 7 |
| Number of Words | 270 | 560 |
| Messages per week To Target | 1 | 6 |

This example is illustrative of the most common analytical task to be performed by the invention—detecting and assessing on a real-time basis the extent of any changes in the subject's psychological state from these psycholinguistic values, followed by a computer generated output providing a course of action to permit a responsive action to be taken to head off later problems or potential risks. The threshold reference for signaling the existence of such changes may be determined in consultation with the user, such as a customer, and is fully programmable. Statistical values, percentage increases or target values derived from actual case studies may be utilized.

In Table 2 it is clear that the increases contained in the April 10$^{th}$ email represent about double the previous mean values. This data leaves little doubt of the importance of the change in the criminal's psychological (emotional) state.

In this case, the invention produces a warning output communication containing three types of information. First, a general warning is issued, identifying that there has been a significant change in the scores of the author. This change is then characterized as an increase in the psychological state of anger. Second, the user is offered the option of further inquiry to break the general anger warning down into its component parts. In this case, the data in Table 2 are reviewed along with a textual description of its meaning and interpretation.

An example of a textual description is as follows:

The warning you have received was based on the following information. Mr. Smith's email message to his supervisor, Ms. Brown, of April 10$^{th}$ contained an increase from his baseline in several measures associated with anger. There was an increase of 240% in negative phrases such as "no, not, never, etc." which are associated with general negativity and opposition. There was an increase of 94% in his use of evaluators—phrases that make strong judgments about right or wrong or other personal values. An increase in evaluators is often associated with strong feelings about a subject and indicative of increased rigidity. In addition, there was an increase of 107% in the number of words in this email. Increases in number of words per email in this context may indicate emotional arousal. The number of emails Mr. Smith sends to his supervisor, Ms. Brown, also increased by 500%, indicating an unusual increase in his attention to her within the last week. Finally, Mr. Smith's email to Ms. Brown contained the following seven alert phrases: "big surprise, quit, fire, garbage, screw-up, relieve me of my duties, and damage."

Second, the user is given the option of isolating the specific words and phrases that generated these warnings. In addition, the original emails may be retrieved from the database and statistical module 18.

Third, the invention also generates options and recommendations for the user, designed for the organization of the user. These options and recommendations are fully programmable.

Table 3 below illustrates some of the possible types of options and recommendation output(s) that may be programmed in a warning output communication. These may be issued individually or in combination. That is, there may be circumstances where more than one output applies.

TABLE 3

Examples of Fully Programmable Option and Recommendation Output

1. "Advise security, law enforcement and legal counsel of concerns immediately." This output is generated by psychological profiling variables indicative of the possible presence of anger and/or disorganization, key words indicating the risk of violence, and message characteristics indicating a possible target for this action.
2. "Notify a medical/psyschological professional or employee assistance program of our concern about the author." This output is generated by psychological profiling variables indicating the possible presence of psychopathology, including depression, cognitive or emotional instability or other problems, and key words and message characteristics indicating behaviors accompanying this state (suicidal ideas, a marked decrease in message frequency, an increase in error rates, decreases in typing speed, indicating difficulties with concentration and attention, etc.)
3. "Query the author's supervisor regarding the author's recent behavior." This output communication is generated when signs of change in psychological profiling variables and message characteristics indicative of psychological difficulties not approaching major psychopathology and keywords that do not indicate major immediate risks of harm to the employee or others are detected.
4. "Notify a professional profiling analyst of the electronic generated communications of concern about the employee and requesst further analysis or assistance." This output communication is generated if the user desires more advanced analysis of the employee's communication and advice on management of the employee. This output communication may be generated when concerns regarding espionage, sabotage, intellectual property violations, deception or other potential violations are suspected.

This analytical process is repeated many times per email depending upon the programmable psychological changes targeted by the user to be monitored and to which corrective action may be desirable. As described above, possible programmable psychological target changes, in addition to anger include, without limitation, anxiety or depression. Alert phrases may also be designed to target these psychological states as well as words associated with specific threats.

In addition to detecting and analyzing changes in an author, the system can also be utilized to create warnings when values on key variables reach or exceed specific threshold reference levels, independent of any changes. These may include psychological profiling values, key words or alert phrases or message characteristics. These values are typically derived in collaboration with the user and are tailored to the specific work environment which are then programmed into the operation of the system. They may also be based on parameters derived from past episodes of computer or other violations.

For example, below is a portion of the email from the computer crime perpetrator which is the basis for FIGS. 2-7 cited above.

"Until you fire me or I quit, I have to take orders from you . . . Unless he is a trained expert, I won't give him access . . . If you order me to give him root access, then you have to permanently relieve me of my duties on that machine. I won't be garbage cleaner if someone screws up . . . I won't compromise on that."

Table 4 gives examples from each of the three categories of values which could be used to trigger a warning based on the occurrence of a single communication.

TABLE 4

Examples of Single Message Warning Values

| Psychological Profiling Variables | |
|---|---|
| Negatives per words | .03 |
| Me per words | .02 |
| Evaluators per words | .06 |
| Alert Phrases | |
| fire, quit, garbage, root access | |
| Message Characteristics | |
| Message length | 550 words |

As can be seen from the text, there are an unusual number of negatives and evaluators in this excerpt, reflecting anger and value judgments, respectively. The normal values of negatives and evaluators vary by subject group but are typically lower by a factor of 50-100%. In addition, on average individuals produce only one "me" per 1,000 words. "Me" can only be used in a passive position in a sentence, indicating that the author is the recipient of action from the environment. High rates of "me" are often associated with the feelings of victimization perpetrators express prior to their acts. Finally, the length of an average email can vary from location to location and is best established for each customer. However, the average email length is approximately 250 words. A message of twice that length can indicate expansiveness, characteristic of anger, and could also serve as a warning indicator. While the above examples are included for illustrative purposes of an application of the invention, specific constellations of values are typically constructed to serve as warning indicators from a much larger pool of available variables in accordance with the invention. The programming of the modules of the embodiments used in the practice of the invention may be in accordance with any known technological and programming language.

While the present invention has been described in terms of the preferred embodiments, it should be understood that numerous modifications may be made thereto. It is intended that all such modifications fall within the scope of the appended claims.

What is claimed is:

1. A method of computer analysis of computer-mediated communications, said method comprising:
   collecting at least one computer-mediated communication produced by or received by an author;
   parsing a text of the collected at least one computer-mediated communication to identify categories of information therein;
   processing the categories of information with at least one analysis to quantify at least one type of information in each category;
   generating a first output communication regarding the at least one computer-mediated communication describing the psychological state, attitudes or characteristics of the author of the communication; and
   generating a second output communication when a difference between the quantification of at least one type of information for at least one category and a reference for the at least one category is detected involving a psychological state, attitude or characteristic of the author to which a responsive action should be taken, with content of the second output communication and the at least one category being programmable to define a psychological state, attitude or characteristic in response to which an action should be taken and the action that is to be taken in response to the defined psychological state, attitude or characteristic.

2. A method in accordance with claim 1 wherein:
   processing the categories of information with at least one analysis to quantify at least one type of information in each category comprises collecting, parsing and processing a more recent computer-mediated communication;
   the reference for the at least one category is generated by collecting, parsing, and processing a plurality of computer-mediated communications generated over a period of time;
   the first output communication is generated over said time period; and
   the second output communication is generated when the difference between the quantification of the current computer-mediated communication for at least one category and the reference for the at least one category is detected involving a psychological state, attitude or characteristic of the author to which a responsive action should be taken.

3. A method in accordance with claim 2 wherein:
   the second output communication indicates that the author should be studied.

4. A method in accordance with claim 3 wherein:
   the categories of information are processed with a plurality of analyses.

5. A method in accordance with claim 4 wherein:
   the plurality of analyses comprise a psychological profiling algorithm which provides an indication of a psychological state, attitudes, or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

6. A method in accordance with claim 3 wherein:
the at least one analysis comprises at least one of a psychological profiling algorithm which provides an indication of a psychological state, attitudes, or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

7. A method in accordance with claim 3 wherein:
the at least one computer-mediated communication is collected by an organization with which the author is affiliated; and
the second output communication is present on a system of the organization and is directed to or from the organization.

8. A method in accordance with claim 7 wherein:
each reference is set by the organization.

9. A method in accordance with claim 2 wherein:
the categories of information are processed with a plurality of analyses.

10. A method in accordance with claim 9 wherein:
the plurality of analyses comprise a psychological profiling algorithm which provides an indication of a psychological state, attitudes or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

11. A method in accordance with claim 2 wherein:
the at least one analysis comprises at least one of a psychological profiling algorithm which provides an indication of a psychological state of the author, at least one key word algorithm which processes any phrases and/or threatening acts to further identify a psychological state of the author and how the author may react to the identified psychological state and at least one message characteristic algorithm which analyzes characteristics of the computer-mediated communication related to identify a psychological state and/or at least one possible action of the author.

12. A method in accordance with claim 2 wherein:
the second output communication regards at least one of a psychological state of the author represented in the at least one computer-mediated communication and an investigation of the psychological state of the author of the at least one computer-mediated communication.

13. A method in accordance with claim 1 wherein:
only one computer-mediated communication is collected, parsed and processed.

14. A method in accordance with claim 13 wherein:
the second output communication pertains to a further investigation to be taken regarding the author.

15. A method in accordance with claim 14 wherein:
a plurality of analyses are used to process the categories of information.

16. A method in accordance with claim 15 wherein:
the plurality of analyses comprise a psychological profiling algorithm which provides an indication of a psychological state, attitudes, or characteristics of the author, at least one key word algorithm which processes any phrases and/or threatening acts to further identify a psychological state of the author and how the author may react to the identified psychological state and at least one message characteristic algorithm which analyzes characteristics of the at least one computer-mediated communication to identify a psychological state and/or at least one possible action of the author.

17. A method in accordance with claim 14 wherein:
the at least one analysis comprises at least one of a psychological profiling algorithm which provides an indication of a psychological state of the author, at least one key word algorithm which processes any phrases and/or threatening acts to further identify a psychological state of the author and how the author may react to the identified psychological state and at least one message characteristic algorithm which analyzes the computer-mediated communication related to the psychological state and/or at least one possible action of the author.

18. A method in accordance with claim 14 wherein:
the only one computer-mediated communication is collected by an organization with which the author is affiliated; and
the second output communication is present on a system of the organization and is directed to or from the organization.

19. A method in accordance with claim 18 wherein:
each reference is set by the organization.

20. A method in accordance with claim 13 wherein:
the categories of information are processed with a plurality of analyses.

21. A method in accordance with claim 20 wherein:
the plurality of analyses comprise a psychological profiling algorithm which provides an indication of a psychological state, attitudes or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

22. A method in accordance with claim 13 wherein:
the at least one analysis comprises at least one of a psychological profiling algorithm which provides an indication of a psychological state of the author, at least one key word algorithm which processes any phrases and/or threatening acts to further identify a psychological state of the author and how the author may react to the identified psychological state and at least one message characteristic algorithm which analyzes characteristics of the computer-mediated communication related to identify a psychological state and/or at least one possible action of the author.

23. A method in accordance with claim 13 wherein:
the only one computer-mediated communication is collected by an organization with which the author is affiliated; and the second output communication is directed to the organization and pertains to further action to be taken regarding the author.

24. A method in accordance with claim 23 wherein:
each reference is static and is indicative that a psychological state of the author is of concern to the organization.

25. A method in accordance with claim 13 wherein:
the second output communication regards at least one of a psychological state of the author represented in the at least one computer-mediated communication and an investigation of the psychological state of the author of the at least one computer-mediated communication.

26. A method in accordance with claim 13 wherein:
the second output communication is used to alter the at least one computer-mediated communication.

27. A method in accordance with claim 26 wherein:
the author uses the second output communication to alter the at least one computer-mediated communication.

28. A method in accordance with claim 27 wherein:
the altering of the at least one computer-mediated communication modifies a psychological state reflected in the at least one computer-mediated communication in a manner desired by the author.

29. A method in accordance with claim 1 wherein:
the second output communication indicates that the author should be studied.

30. A method in accordance with claim 29 wherein:
the categories of information are processed with a plurality of analyses.

31. A method in accordance with claim 30 wherein:
the plurality of analyses comprise a psychological profiling algorithm which provides an indication of a psychological state, attitudes, or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

32. A method in accordance with claim 29 wherein:
the at least one analysis comprises at least one of a psychological profiling algorithm which provides an indication of a psychological state, attitudes, or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

33. A method in accordance with claim 29 wherein:
the at least one computer-mediated communication is collected by an organization with which the author is affiliated; and
the second output communication is present on a system of the organization and is directed to or from the organization.

34. A method in accordance with claim 33 wherein:
each reference is set by the organization.

35. A method in accordance with claim 1 wherein:
the categories of information are processed with a plurality of analyses.

36. A method in accordance with claim 35 wherein:
the plurality of analyses comprise a psychological profiling algorithm which provides an indication of a psychological state, attitudes or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

37. A method in accordance with claim 1 wherein:
the at least one analysis comprises at least one of a psychological profiling algorithm which provides an indication of a psychological state, attitudes or characteristics of the author, at least one key word algorithm which processes any phrases and/or threatening acts to further identify a psychological state of the author and how the author may react to the identified psychological state, and at least one message characteristic algorithm which analyzes the computer-mediated communication related to the psychological state and/or at least one possible action of the author.

38. A method in accordance with claim 37 wherein:
the second output communication is about the author; and
the second output communication is generated in response to processing of the reference for the at least one psychological profiling algorithm and the quantification produced by the psychological profiling algorithm.

39. A method in accordance with claim 37 wherein:
the second output communication is about the author; and
the second output communication is generated in response to processing of the reference for the at least one key word algorithm and the quantification produced by the at least one key word algorithm.

40. A method in accordance with claim 37 wherein:
the second output communication is about the author; and
the second output communication is generated in response to a comparison of the reference for the at least one message characteristic algorithm and the quantification produced by the at least one message characteristic algorithm.

41. A method in accordance with claim 37 wherein:
the at least one psychological profiling algorithm quantifies at least one of words written in bold face, words written in italics, profanity, or email symbols.

42. A method in accordance with claim 37 wherein:
the at least one psychological profiling algorithm quantifies the words, types of words, phrases, or subjects I, we, me, negatives, quantifiers, retractors, direct references, explainers, expressions of feeling, evaluators, adverbial intensifiers, rhetorical questions, interruptions, interrogatives and imperatives.

43. A method in accordance with claim 42 wherein:
the at least one psychological profiling algorithm produces an assessment of a psychological state of the author.

44. A method in accordance with claim 43 wherein:
the psychological state of the author is at least one of anger, anxiety, depression, emotional withdrawal, lack of flexibility, impulsiveness and emotional stability.

45. A method in accordance with claim 42 wherein:
the at least one psychological profiling algorithm provides an interpretation of the psychological state and/or risk of at least one of the words, types of words, phrases and subjects of the at least one computer-mediated communication.

46. A method in accordance with claim 42 wherein:
the at least one psychological profiling algorithm provides an interpretation of the psychological state and/or risk represented by at least one combination of at least one of the words, types of words, phrases or subjects of the at least one computer-mediated communication.

47. A method in accordance with claim 46 wherein:
the at least one key word algorithm provides information regarding at least one of employee attitude, actions toward individuals, at least one organization and at least one organizational interest.

48. A method in accordance with claim 42 wherein:
the characteristics include, with regard to the at least one computer-mediated communication, at least one of the number of words, the time of day written, the writing time, the number of words written per minute, the recipient, spelling errors, grammatical errors, the number of words per sentence, and the communication rate in terms of at least one of a number of computer-mediated communications per hour or day.

49. A method in accordance with claim 37 wherein:
the at least one key word algorithm quantifies phrases and/or threatening acts to identify a psychological state.

50. A method in accordance with claim 49 wherein:
the phrases and/or threatening acts involve at least one of anger, grief, threats, or accusations.

51. A method in accordance with claim 1 wherein:
the at least one computer-mediated communication is an email message.

52. A method in accordance with claim 1 wherein:
the at least one computer-mediated communication is chat from a chat room.

53. A method in accordance with claim 1 wherein:
the at least one computer-mediated communication is web site information collected from a web site.

54. A method in accordance with claim 1 wherein:
the second output communication assesses a risk posed by the author based upon the at least one computer-mediated communication.

55. A method in accordance with claim 54 wherein:
the author is affiliated with an organization; and
the second output communication pertains to a course of action to be taken by the organization which collected the at least one computer-mediated communication.

56. A method in accordance with claim 55 wherein:
the course of action is that the author be further assessed and counseled regarding the psychological state represented in the at least one computer-mediated communication.

57. A method in accordance with claim 1 wherein:
the second output communication regards at least one of a psychological state of the author represented in the at least one computer-mediated communication, and an investigation of the psychological state of the author of the at least one computer-mediated communication.

58. A method in accordance with claim 1 wherein:
the second output communication is used to alter the at least one computer-mediated communication.

59. A method in accordance with claim 58 wherein:
the author uses the second output communication to alter the at least one computer-mediated communication.

60. A method in accordance with claim 59 wherein:
the altering of the at least one computer-mediated communication modifies a psychological state reflected in the at least one computer-mediated communication in a manner desired by the author.

61. A method in accordance with claim 58 wherein:
the plurality of analyses comprise a psychological profiling algorithm which provides an indication of a psychological state, attitudes, or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state and/or at least one possible action of the author.

62. A method in accordance with claim 1 wherein:
the category involving a psychological state is a change in psychological state.

63. An analyzing system which provides computer analysis of computer-mediated communications, said analyzing system comprising:
a computer system having at least one processor, a database coupled to the at least one processor, and an input which collects at least one computer-mediated communication produced by or received by an author; and
a parser, a text of executed by the at least one processor, which parses the collected at least one computer-mediated communication to identify categories of information therein, and wherein:
the at least one processor performs at least one analysis of one of the categories of information to quantify at least one type of information in each analyzed category; and
the at least one processor generates an output communication when a difference between the quantification of at least one type of information for at least one category and a reference for the at least one category is detected involving a psychological state, attitude or characteristic of the author to which a responsive action should be taken, with content of the second output communication and the at least one category being programmable to define a psychological state in response to which an action should be taken and the action that should be taken in response to the defined psychological state, attitude or characteristic.

64. A system as recited in claim 63 wherein:
the at least one analysis is at least one algorithm.

65. A system in accordance with claim 63 wherein:
the at least one analysis comprises at least one of a psychological profiling algorithm which provides an indication of a psychological state, attitudes or characteristics of the author, at least one key word algorithm which processes any phrases and/or threatening acts to further identify a psychological state of the author and how the author may react to the identified psychological state, and at least one message characteristic algorithm which analyzes the computer-mediated communication related to the psychological state of the author and/or at least one possible action of the author.

66. A system as recited in claim 63 wherein:
a plurality of analyses are performed;
each analysis is an algorithm; and
the plurality of analyses comprise a psychological profiling algorithm which provides an indication of a psychological state, attitudes or characteristics of the author, at least one key word algorithm which processes any phrases and/or threatening acts to further identify a psychological state of the author and how the author may react to the identified psychological state, and at least one message characteristic algorithm which analyzes characteristics of the at least one computer-mediated communication to identify a psychological state of the author and/or at least one possible action of the author.

67. A system as recited in claim 63 wherein:
the second output communication is generated by the at least one processor by a report generator program which generates a report pertaining to the author.

68. A system in accordance with claim 63 wherein:
the input is coupled to a communication system of an individual or organization with which the author is affiliated and which collects the at least one computer-mediated communication; and
the output communication is directed to the organization or individual indicating that at least one of an investigation and/or corrective action should be considered relative to the author.

69. A system in accordance with claim 63 wherein:
the second output communication is used to alter the at least one computer-mediated communication.

70. A system in accordance with claim 69 wherein:
the author uses the second output communication to alter the at least one computer-mediated communication.

71. A system in accordance with claim 70 wherein:
the altering of the at least one computer-mediated communication modifies a psychological state, attitude or characteristic reflected in the at least one computer-mediated communication in a manner desired by the author.

* * * * *